United States Patent
Engleke et al.

(10) Patent No.: US 9,131,045 B2
(45) Date of Patent: Sep. 8, 2015

(54) SYSTEM FOR TEXT ASSISTED TELEPHONY

(75) Inventors: Robert M. Engleke, Madison, WI (US); Kevin R. Colwell, Middleton, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

(21) Appl. No.: 13/486,205

(22) Filed: Jun. 1, 2012

(65) Prior Publication Data
US 2012/0250836 A1    Oct. 4, 2012

Related U.S. Application Data

(63) Continuation of application No. 11/955,476, filed on Dec. 13, 2007, now Pat. No. 8,213,578, which is a continuation of application No. 11/257,703, filed on Oct. 25, 2005, now Pat. No. 7,319,740, which is a continuation of application No. 10/634,965, filed on Aug. 5, 2003, now Pat. No. 7,003,082, which is a continuation of application No. 09/938,194, filed on Aug. 23, 2001, now Pat. No. 6,603,835.

(51) Int. Cl.
| | |
|---|---|
| *H04M 11/00* | (2006.01) |
| *H04M 1/247* | (2006.01) |
| *G10L 15/26* | (2006.01) |
| *H04M 11/06* | (2006.01) |
| *G10L 15/22* | (2006.01) |
| *H04M 1/27* | (2006.01) |
| *H04M 1/725* | (2006.01) |

(Continued)

(52) U.S. Cl.
CPC .............. *H04M 1/2475* (2013.01); *G10L 15/26* (2013.01); *H04M 11/066* (2013.01); *G10L 15/22* (2013.01); *H04M 1/271* (2013.01); *H04M 1/72519* (2013.01); *H04M 3/42391* (2013.01); *H04M 11/08* (2013.01); *H04M 2201/40* (2013.01); *H04M 2201/60* (2013.01); *H04M 2250/74* (2013.01)

(58) Field of Classification Search
CPC ............ H04M 11/066; H04M 1/2475; H04M 2201/60; H04M 2201/40; H04M 3/42391; G10L 15/26
USPC ............ 379/52, 93.15, 88.14, 93.07; 370/352
See application file for complete search history.

(56) References Cited

U.S. PATENT DOCUMENTS

| | | | |
|---|---|---|---|
| 3,372,246 | A | 3/1968 | Knuepfer |
| 3,507,997 | A | 4/1970 | Weitbrecht |

(Continued)

FOREIGN PATENT DOCUMENTS

| | | |
|---|---|---|
| DE | 2749923 A1 | 5/1979 |
| DE | 3410619 A1 | 10/1985 |

(Continued)

OTHER PUBLICATIONS

United States Patent and Trademark Office, Office Action Summary and Detailed Action, U.S. Appl. No. 08/946,538 (Patent No. 6,075,841), Sep. 18, 1998.

(Continued)

*Primary Examiner* — Stella Woo
(74) *Attorney, Agent, or Firm* — Quarles & Brady LLP

(57) ABSTRACT

A method of and system for operating a captioned telephone service, the method comprising the steps of providing words spoken by a remote user to a relay, at the relay, a call assistant listening to the words spoken by the remote user and re-voicing the words into a computer with voice recognition software trained to the voice of the call assistant to create a text stream of the words spoken by the remote user and presenting the text stream to an assisted user via a display.

74 Claims, 4 Drawing Sheets

(51) Int. Cl.
*H04M 3/42* (2006.01)
*H04M 11/08* (2006.01)

(56) References Cited

U.S. PATENT DOCUMENTS

| | | | |
|---|---|---|---|
| 3,515,814 A | 6/1970 | Morgan |
| 3,585,303 A | 6/1971 | Chieffo |
| 3,598,920 A | 8/1971 | Fischer |
| 3,896,267 A | 7/1975 | Sachs et al. |
| 4,012,599 A | 3/1977 | Meyer |
| 4,188,665 A | 2/1980 | Nagel |
| 4,201,887 A | 5/1980 | Burns |
| 4,289,931 A | 9/1981 | Baker |
| 4,302,629 A | 11/1981 | Foulkes et al. |
| 4,354,252 A | 10/1982 | Lamb |
| 4,430,726 A | 2/1984 | Kasday |
| 4,451,701 A | 5/1984 | Bendig |
| 4,490,579 A | 12/1984 | Godoshian |
| 4,503,288 A | 3/1985 | Kessler |
| 4,524,244 A | 6/1985 | Faggin |
| 4,659,876 A | 4/1987 | Sullivan et al. |
| 4,713,808 A | 12/1987 | Gaskill |
| 4,754,474 A | 6/1988 | Feinson |
| 4,777,469 A | 10/1988 | Engelke et al. |
| 4,799,254 A | 1/1989 | Dayton |
| 4,815,121 A | 3/1989 | Yoshida |
| 4,817,135 A | 3/1989 | Winebaum |
| 4,839,919 A | 6/1989 | Borges |
| 4,849,750 A | 7/1989 | Andros |
| 4,866,778 A | 9/1989 | Baker |
| 4,868,860 A | 9/1989 | Andros |
| 4,879,738 A | 11/1989 | Petro |
| 4,897,868 A | 1/1990 | Engelke et al. |
| 4,951,043 A | 8/1990 | Minami |
| 4,959,847 A | 9/1990 | Engelke et al. |
| 5,027,406 A | 6/1991 | Roberts et al. |
| 5,033,088 A | 7/1991 | Shipman |
| 5,051,924 A | 9/1991 | Bergeron |
| 5,081,673 A | 1/1992 | Engelke et al. |
| 5,086,453 A | 2/1992 | Senoo |
| 5,091,906 A | 2/1992 | Reed et al. |
| 5,095,307 A | 3/1992 | Shimura |
| 5,099,507 A | 3/1992 | Mukai |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley et al. |
| 5,199,077 A | 3/1993 | Wilcox et al. |
| 5,210,689 A | 5/1993 | Baker |
| 5,214,428 A | 5/1993 | Allen |
| 5,216,702 A | 6/1993 | Ramsden |
| 5,249,220 A | 9/1993 | Moskowitz |
| 5,289,523 A | 2/1994 | Vasile et al. |
| 5,294,982 A | 3/1994 | Salomon |
| 5,307,399 A | 4/1994 | Dai |
| 5,318,340 A | 6/1994 | Henry |
| 5,325,417 A | 6/1994 | Engelke et al. |
| 5,327,479 A | 7/1994 | Engelke et al. |
| 5,339,358 A | 8/1994 | Danish |
| 5,343,519 A | 8/1994 | Feldman |
| 5,351,288 A | 9/1994 | Engelke et al. |
| 5,359,651 A | 10/1994 | Draganoff |
| 5,377,263 A | 12/1994 | Bazemore |
| 5,396,650 A | 3/1995 | Terauchi |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |
| 5,432,837 A | 7/1995 | Engelke et al. |
| 5,459,458 A | 10/1995 | Richardson |
| 5,463,665 A | 10/1995 | Millios et al. |
| D364,865 S | 12/1995 | Engelke et al. |
| 5,475,733 A | 12/1995 | Eisdorfer et al. |
| 5,475,798 A | 12/1995 | Handlos |
| 5,487,102 A | 1/1996 | Rothschild |
| 5,497,373 A | 3/1996 | Hulen et al. |
| 5,508,754 A | 4/1996 | Orphan |
| 5,517,548 A | 5/1996 | Engelke et al. |
| 5,519,443 A | 5/1996 | Salomon |
| 5,519,808 A | 5/1996 | Benton, Jr. |
| 5,521,960 A | 5/1996 | Aronow |
| 5,522,089 A | 5/1996 | Kikinis |
| 5,537,436 A | 7/1996 | Bottoms |
| 5,559,855 A | 9/1996 | Dowens |
| 5,559,856 A | 9/1996 | Dowens |
| 5,574,776 A | 11/1996 | Leuca |
| 5,574,784 A | 11/1996 | LaPadula |
| 5,581,593 A | 12/1996 | Engelke et al. |
| 5,604,786 A | 2/1997 | Engelke et al. |
| 5,649,060 A | 7/1997 | Ellozy |
| 5,680,443 A | 10/1997 | Kasday et al. |
| 5,687,222 A | 11/1997 | McLaughlin |
| 5,701,338 A | 12/1997 | Leyen |
| 5,710,806 A | 1/1998 | Lee et al. |
| 5,712,901 A | 1/1998 | Meermans |
| 5,724,405 A | 3/1998 | Engelke et al. |
| 5,745,550 A | 4/1998 | Eisdorfer |
| 5,751,338 A | 5/1998 | Ludwig, Jr. |
| 5,787,148 A | 7/1998 | August |
| 5,799,273 A | 8/1998 | Mitchell et al. |
| 5,809,112 A | 9/1998 | Ryan |
| 5,809,425 A | 9/1998 | Colwell et al. |
| 5,815,196 A | 9/1998 | Alshawi |
| 5,826,102 A | 10/1998 | Escobar et al. |
| 5,850,627 A | 12/1998 | Gould et al. |
| 5,870,709 A | 2/1999 | Bernstein |
| 5,893,034 A | 4/1999 | Hikuma |
| 5,899,976 A | 5/1999 | Rozak |
| 5,905,476 A | 5/1999 | McLaughlin et al. |
| 5,909,482 A | 6/1999 | Engelke |
| 5,915,379 A | 6/1999 | Wallace |
| 5,917,888 A | 6/1999 | Giuntoli |
| 5,926,527 A | 7/1999 | Jenkins |
| 5,940,475 A | 8/1999 | Hansen |
| 5,974,116 A | 10/1999 | Engelke et al. |
| 5,978,014 A | 11/1999 | Martin |
| 5,982,853 A | 11/1999 | Liebermann |
| 5,982,861 A | 11/1999 | Holloway |
| 5,991,291 A | 11/1999 | Asai |
| 5,991,723 A | 11/1999 | Duffin |
| 5,995,590 A | 11/1999 | Brunet et al. |
| 6,002,749 A | 12/1999 | Hansen et al. |
| 6,067,516 A | 5/2000 | Levay |
| 6,075,534 A | 6/2000 | VanBuskirk et al. |
| 6,075,841 A | 6/2000 | Engelke et al. |
| 6,075,842 A | 6/2000 | Engelke et al. |
| 6,100,882 A | 8/2000 | Sharman et al. |
| 6,141,415 A | 10/2000 | Rao |
| 6,173,259 B1 | 1/2001 | Bijl et al. |
| 6,175,819 B1 | 1/2001 | Van Alstine |
| 6,181,736 B1 | 1/2001 | McLaughlin |
| 6,188,429 B1 | 2/2001 | Martin et al. |
| 6,233,314 B1 | 5/2001 | Engelke |
| 6,243,684 B1 | 6/2001 | Stuart |
| 6,278,772 B1 | 8/2001 | Bowater |
| 6,298,326 B1 | 10/2001 | Feller |
| 6,307,921 B1 | 10/2001 | Engelke et al. |
| 6,314,396 B1 | 11/2001 | Monkowski |
| 6,324,507 B1 | 11/2001 | Lewis et al. |
| 6,345,251 B1 | 2/2002 | Jansson |
| 6,377,925 B1 | 4/2002 | Greene, Jr. et al. |
| 6,381,472 B1 | 4/2002 | LaMedica, Jr. |
| 6,385,586 B1 | 5/2002 | Dietz |
| 6,389,114 B1 | 5/2002 | Dowens et al. |
| 6,445,799 B1 | 9/2002 | Taenzer |
| 6,493,426 B2 | 12/2002 | Engelke et al. |
| 6,504,910 B1 | 1/2003 | Engelke et al. |
| 6,507,735 B1 | 1/2003 | Baker |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 * | 8/2003 | Engelke et al. ............... 379/52 |

(56) References Cited

U.S. PATENT DOCUMENTS

| | | |
|---|---|---|
| 6,625,259 B1 | 9/2003 | Hollatz |
| 6,661,879 B1 | 12/2003 | Schwartz et al. |
| 6,668,042 B2 | 12/2003 | Michaelis |
| 6,668,044 B1 | 12/2003 | Schwartz et al. |
| 6,701,162 B1 | 3/2004 | Everett |
| 6,748,053 B2 | 6/2004 | Engelke et al. |
| 6,763,089 B2 | 7/2004 | Feigenbaum |
| 6,775,360 B2 | 8/2004 | Davidson |
| 6,816,468 B1 | 11/2004 | Cruickshank |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto |
| 6,885,731 B2 | 4/2005 | Engelke et al. |
| 6,894,346 B2 | 5/2005 | Onose |
| 6,934,366 B2 | 8/2005 | Engelke et al. |
| 6,934,376 B1 | 8/2005 | McLaughlin |
| 6,948,066 B2 | 9/2005 | Hind |
| 6,950,500 B1 | 9/2005 | Chaturvedi et al. |
| 6,980,953 B1 | 12/2005 | Kanevsky |
| 7,003,082 B2 * | 2/2006 | Engelke et al. .......... 379/52 |
| 7,006,604 B2 | 2/2006 | Engelke |
| 7,035,383 B2 | 4/2006 | O'Neal |
| 7,088,832 B1 | 8/2006 | Cooper |
| 7,117,152 B1 | 10/2006 | Mukherji |
| 7,117,438 B2 | 10/2006 | Wallace |
| 7,142,642 B2 | 11/2006 | McClelland et al. |
| 7,142,643 B2 | 11/2006 | Brooksby |
| 7,164,753 B2 | 1/2007 | Engelke et al. |
| 7,221,405 B2 | 5/2007 | Basson |
| 7,233,655 B2 | 6/2007 | Gailey |
| 7,295,663 B2 | 11/2007 | McLaughlin |
| 7,313,231 B2 | 12/2007 | Reid |
| 7,315,612 B2 | 1/2008 | McClelland |
| 7,319,740 B2 | 1/2008 | Engelke et al. |
| 7,406,413 B2 | 7/2008 | Geppert |
| 7,555,104 B2 | 6/2009 | Engelke |
| 7,573,985 B2 | 8/2009 | McClelland |
| 7,606,718 B2 | 10/2009 | Cloran |
| 7,660,398 B2 * | 2/2010 | Engelke et al. .......... 379/52 |
| 7,792,701 B2 | 9/2010 | Basson |
| 7,848,358 B2 | 12/2010 | LaDue |
| 7,881,441 B2 * | 2/2011 | Engelke et al. .......... 379/52 |
| 8,213,578 B2 * | 7/2012 | Engleke et al. .......... 379/52 |
| 8,379,801 B2 | 2/2013 | Romriell |
| 2002/0007275 A1 | 1/2002 | Goto et al. |
| 2002/0085685 A1 | 7/2002 | Engelke et al. |
| 2002/0085703 A1 | 7/2002 | Proctor |
| 2002/0094800 A1 | 7/2002 | Trop et al. |
| 2002/0101537 A1 | 8/2002 | Basson et al. |
| 2002/0178001 A1 | 11/2002 | Balluff et al. |
| 2004/0083105 A1 | 4/2004 | Jaroker |
| 2005/0094776 A1 | 5/2005 | Haldeman et al. |
| 2005/0226394 A1 | 10/2005 | Engelke et al. |
| 2005/0226398 A1 | 10/2005 | Bojeun |
| 2006/0140354 A1 | 6/2006 | Engelke |
| 2007/0036282 A1 | 2/2007 | Engelke et al. |
| 2008/0152093 A1 | 6/2008 | Engleke et al. |
| 2008/0187108 A1 | 8/2008 | Engelke et al. |
| 2010/0063815 A1 | 3/2010 | Cloran et al. |
| 2011/0087491 A1 | 4/2011 | Wittenstein et al. |
| 2011/0123003 A1 | 5/2011 | Romriell et al. |
| 2012/0250837 A1 | 10/2012 | Engleke et al. |
| 2013/0308763 A1 | 11/2013 | Engelke et al. |

FOREIGN PATENT DOCUMENTS

| | | |
|---|---|---|
| DE | 10328884 A1 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| FR | 2538978 | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | 55044283 A | 3/1980 |
| JP | 57055649 A | 4/1982 |
| JP | 58134568 A | 8/1983 |
| JP | 60259058 A | 12/1985 |
| JP | 63198466 A | 8/1988 |
| JP | H04248596 A | 9/1992 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9839901 A1 | 9/1998 |
| WO | 9913634 A1 | 3/1999 |
| WO | 9952237 A1 | 10/1999 |
| WO | 0049601 A1 | 8/2000 |
| WO | 0155914 A1 | 8/2001 |
| WO | 0158165 A2 | 8/2001 |
| WO | 0180079 A2 | 10/2001 |
| WO | 02077971 A1 | 10/2002 |
| WO | 03026265 A1 | 3/2003 |
| WO | 03071774 A1 | 8/2003 |
| WO | 2005081511 A1 | 9/2005 |

OTHER PUBLICATIONS

Applicant, First Amendment (Response to Sep. 18, 1998 Office Action), U.S. Appl. No. 08/946,538 (Patent No. 6,075,841), Jan. 15, 1999.

United States Patent and Trademark Office, Office Action Summary and Detailed Action, U.S. Appl. No. 08/946,538 (Patent No. 6,075,841), Mar. 26, 1999.

Applicant, Response to Mar. 26, 1999 Office Action and Terminal Disclaimer, U.S. Appl. No. 08/946,538 (Patent No. 6,075,841), Jul. 20, 1999.

United States Patent and Trademark Office, Notice of Allowability and Examiner's Amendment and Statement of Reasons for Allowance, U.S. Appl. No. 08/946,538 (Patent No. 6,075,841), Aug. 16, 1999.

United States Patent and Trademark Office, Office Action Summary and Detailed Action, U.S. Appl. No. 09/034,076 (Patent No. 6,075,842), Apr. 6, 1999.

Applicant, Response to Apr. 6, 1999 Office Action and Terminal Disclaimer, U.S. Appl. No. 09/034,076 (Patent No. 6,075,842), Jul. 21, 1999.

United States Patent and Trademark Office, Notice of Allowability, U.S. Appl. No. 09/034,076 (Patent No. 6,075,842), Jan. 7, 2000.

United States Patent and Trademark Office, Notice of Allowability and Examiner's Statement of Reasons for Allowance, U.S. Appl. No. 09/108,790 (Patent No. 5,974,116), May 11, 1999.

Canadian Intellectual Property Office, Examination Report, Application No. CA 2,268,383, May 10, 2007.

Applicant, Response to May 10, 2007 Office Action, Application No. CA 2,268,383, Nov. 9, 2007.

United Kingdom Patent Office, Examination Report, Application No. GB 9908310.7 (Patent No. GB 2339363), Jan. 25, 2003.

Applicant, Response to United Kingdom Patent Office Jan. 25, 2003 Report, Application No. GB 9908310.7 (Patent No. GB 2339363), Aug. 26, 2003.

United Kingdom Patent Office, Examination Report, Application No. GB 9908310.7 (Patent No. GB 2339363), Sep. 23, 2003.

Applicant, Response to United Kingdom Patent Office Sep. 23, 2003 Report, Application No. GB 9908310.7 (Patent No. GB 2339363), Nov. 17, 2003.

(56) References Cited

OTHER PUBLICATIONS

United Kingdom Patent Office, Examination Report, Application No. GB 9908310.7 (Patent No. GB 2339363), Dec. 16, 2003.
Applicant, Response to United Kingdom Patent Office Dec. 16, 2003 Report, Application No. GB 9908310.7 (Patent No. GB 2339363), Dec. 30, 2003.
United States Patent and Trademark Office, Office Action Summary and Detailed Action, U.S. Appl. No. 09/572,819 (Patent No. 6,307,921), Oct. 25, 2000.
Applicant, Response (to Oct. 25, 2000 Office Action) and Terminal Disclaimers, U.S. Appl. No. 09/572,819 (Patent No. 6,307,921), Apr. 25, 2001.
United States Patent and Trademark Office, Notice of Allowability, U.S. Appl. No. 09/572,819 (Patent No. 6,307,921), Jun. 4, 2001.
United States Patent and Trademark Office, Office Action Summary and Detailed Action, U.S. Appl. No. 08/481,856 (Patent No. 5,809,425), Aug. 28, 1996.
Applicant, Amendment (Response to Aug. 18, 1996 Office Action), U.S. Appl. No. 08/481,856 (Patent No. 5,809,425), Feb. 28, 1997.
United States Patent and Trademark Office, Office Action Summary and Detailed Action, U.S. Appl. No. 08/481,856 (Patent No. 5,809,425), May 28, 1997.
Applicant, Amendment (Response to May 28, 1997 Office Action), U.S. Appl. No. 08/481,856 (Patent No. 5,809,425), Nov. 26, 1997.
United States Patent and Trademark Office, Notice of Allowance and Statement of Reasons for Allowance, U.S. Appl. No. 08/481,856 (Patent No. 5,809,425), Dec. 23, 1997.
PCT International Search Report, Application No. PCT/US96/09492, Sep. 4, 1996.
United States Patent and Trademark Office, Office Action Summary and Detailed Action, U.S. Appl. No. 08/367,563, Aug. 2, 1996.
United States Patent and Trademark Office, Office Action Summary and Detailed Action, U.S. Appl. No. 09/153,771, Aug. 3, 1999.
Canadian Intellectual Property Office, Examiner's Report, Application No. CA 2,458,372, May 16, 2011.
Intellectual Property Philippines, Official Action, Application No. PH 12007502940, Jun. 6, 2011.
Applicant, Response to Jun. 6, 2011 Office Action, Application No. PH 12007502940, Aug. 4, 2011.
UK Intellectual Property Office, Examination Report, Application No. GB 0617585.5, Aug. 15, 2008.
UK Intellectual Property Office, Examination Report, Application No. GB 0617585.5, Dec. 17, 2008.
Applicant, Response to Dec. 17, 2008 Official Letter, Application No. GB 0617585.5, Feb. 16, 2009.
European Patent Office, Communication, Application No. EP 04761001.9, Jun. 30, 2011.
United States Patent and Trademark Office, Office Action Summary and Detailed Action, U.S. Appl. No. 09/783,679 (Patent No. 6,594,346), Jun. 5, 2002.
Applicant, Response (to Jun. 5, 2002 Office Action), U.S. Appl. No. 09/783,679 (Patent No. 6,594,346), Dec. 4, 2002.
United States Patent and Trademark Office, Notice of Allowance, U.S. Appl. No. 09/783,679 (Patent No. 6,594,346), Feb. 19, 2003.
United States Patent and Trademark Office, Office Action Summary and Detailed Action, U.S. Appl. No. 09/789,120 (Patent No. 6,567,503), Jun. 17, 2002.
Applicant, Amendment (Response to Jun. 17, 2002 Office Action), U.S. Appl. No. 09/789,120 (Patent No. 6,567,503), Oct. 19, 2002.
United States Patent and Trademark Office, Notice of Allowance, U.S. Appl. No. 09/789,120 (Patent No. 6,567,503), Dec. 30, 2002.
Canadian Intellectual Property Office, Examiner's Report, Application No. CA 2,372,061, Apr. 26, 2004.
Applicant, Response to Apr. 26, 2004 Official Action, Application No. CA 2,372,061, Oct. 26, 2004.
Canadian Intellectual Property Office, Notice of Allowance, Application No. CA 2,372,061, May 26, 2005.
Canadian Intellectual Property Office, Examiner's Report, Application No. CA 2,520,594, Mar. 7, 2006.
Applicant, Response to Mar. 7, 2006 Office Action, Application No. CA 2,520,594, Sep. 6, 2006.
Canadian Intellectual Property Office, Examiner's Report, Application No. CA 2,520,594, Nov. 27, 2006.
Applicant, Response to Nov. 27, 2006 Office Action, Application No. CA 2,520,594, May 25, 2007.
United Kingdom Patent Office, Combined Search and Examination Report, Application No. GB 0203898.2, Aug. 30, 2002.
Applicant, Response to Aug. 30, 2002 Official Letter, Application No. GB 0203898.2, Oct. 28, 2002.
United Kingdom Patent Office, Examination Report, Application No. GB 0203898.2, Jan. 21, 2003.
Applicant, Response to Jan. 21, 2003 Official Letter, Application No. GB 0203898.2, Jul. 15, 2003.
United Kingdom Patent Office, Combined Search and Examination Report, Application No. GB 0225275.7, Jan. 20, 2003.
Applicant, Response to Jan. 20, 2003 Letter, Application No. GB 0225275.7, Jul. 14, 2003.
United States Patent and Trademark Office, Office Action Summary and Detailed Action, U.S. Appl. No. 09/790,413 (Patent No. 6,882,707), Mar. 23, 2004.
Applicant, Response to Restriction Requirement, U.S. Appl. No. 09/790,413 (Patent No. 6,882,707), Apr. 9, 2004.
United States Patent and Trademark Office, Office Action Summary and Detailed Action, U.S. Appl. No. 09/790,413 (Patent No. 6,882,707), May 7, 2004.
Applicant, Response to May 7, 2004 Office Action, U.S. Appl. No. 09/790,413 (Patent No. 6,882,707), Aug. 9, 2004.
United States Patent and Trademark Office, Notice of Allowance, Examiner's Amendment and Interview Summary, U.S. Appl. No. 09/790,413 (Patent No. 6,882,707), Dec. 10, 2004.
United States Patent and Trademark Office, Office Action Summary and Detailed Action, U.S. Appl. No. 10/336,950, Jun. 2, 2003.
United States Patent and Trademark Office, Office Action Summary and Detailed Action, U.S. Appl. No. 11/391,141 (Patent No. 7,881,441), Mar. 9, 2010.
Applicant, First Amendment, U.S. Appl. No. 11/391,141 (Patent No. 7,881,441), Jun. 9, 2010.
United States Patent and Trademark Office, Notice of Allowance, U.S. Appl. No. 11/391,141 (Patent No. 7,881,441), Sep. 21, 2010.
United States Patent and Trademark Office, Supplemental Notice of Allowability, U.S. Appl. No. 11/391,141 (Patent No. 7,881,441), Dec. 7, 2010.
European Patent Office, Communication, Application No. EP 06785768.0, Feb. 7, 2008.
Applicant, Reply to Feb. 7, 2008 Communication, Application No. EP 06785768.0, Mar. 12, 2008.
European Patent Office, Examination Report, Application No. EP 06785768.0, Aug. 9, 2010.
Applicant, Response to Aug. 9, 2010 Communication, Application No. EP 06785768.0, Dec. 20, 2010.
PCT International Search Report and Written Opinion, Application No. PCT/US2006/025236, Oct. 2, 2006.
PCT International Preliminary Report on Patentability, Application No. PCT/US2006/025236, Jan. 9, 2008.
Republic of the Philippines Intellectual Property Office, Findings/Action of Examiner, Application No. PH 1-2007-502940, Oct. 29, 2010.
Applicant, Response to Oct. 29, 2010 Office Action, Application No. PH 1-2007-502940, Dec. 29, 2010.
IP Australia, Examiner's First Report, Application No. AU 2006263680, Jun. 29, 2009.
Applicant, Response to Jun. 29, 2009 Examination Report, Application No. AU 2006263680, Jun. 17, 2010.
IP Australia, Examiner's Report No. 2, Application No. AU 2006263680, Jun. 22, 2010.
Applicant, Response to Jun. 22, 2010 Examination Report, Application No. AU 2006263680, Jul. 16, 2010.
United States Patent and Trademark Office, Office Action Summary and Detailed Action, U.S. Appl. No. 11/361,114 (Patent No. 7,555,104), May 21, 2007.
Applicant, Terminal Disclaimer, U.S. Appl. No. 11/361,114 (Patent No. 7,555,104), Jul. 23, 2007.

(56) References Cited

OTHER PUBLICATIONS

United States Patent and Trademark Office, Notice of Allowance and Examiner's Statement of Reasons for Allowance, U.S. Appl. No. 11/361,114 (Patent No. 7,555,104), Sep. 15, 2008.
Applicant, Request for Continued Examination and Submission of Supplemental Information Disclosure Statement, U.S. Appl. No. 11/361,114 (Patent No. 7,555,104), Dec. 15, 2008.
United States Patent and Trademark Office, Notice of Allowance, U.S. Appl. No. 11/361,114 (Patent No. 7,555,104), Feb. 25, 2009.
United States Patent and Trademark Office, Notice of Allowance and Examiner's Statement of Reasons for Allowance, U.S. Appl. No. 09/876,340 (Patent No. 6,504,910), Aug. 13, 2002.
PCT International Search Report, Application No. PCT/US02/18156, Oct. 29, 2002.
Cooper, R. J., Break Feature for Half-Duplex Modem, IBM Technical Disclosure Bulletin, vol. 17, No. 8, pp. 2386-2387, Jan. 1975.
Gopalakrishnan, Effective Set-Up for Performing Phone Conversations by the Hearing Impaired, IBM Technical Disclosure Bulletin, vol. 34, No. 78, pp. 423-426, 1991.
Moskowitz, Telocator Alphanumeric Protocol, Version 1.8, Feb. 4, 1997.
Smith, R. L., ASCII to Baudot, Radio Electronics, pp. 51-58, Mar. 1976.
Applicant, Response to Apr. 10, 2012 Official Action, Canadian Application No. 2,556,933, Jul. 12, 2012.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
United States Patent and Trademark Office, Communication, U.S. Appl. No. 12/686,688, Nov. 8, 2012.
PCT International Search Report, Application No. PCT/US93/04753, Aug. 20, 1993.
European Patent Office, Supplementary European Search Report, Application No. EP 93911360.1 (Patent No. EP 0596078), Mar. 27, 1995.
European Patent Office, Communication, Application No. EP 93911360.1 (Patent No. EP 0596078), Jul. 10, 1998.
Applicant, Response to Jul. 10, 1998 Communication, Application No. EP 93911360.1 (Patent No. EP 0596078), Jan. 20, 1999.
European Patent Office, Communication, Application No. EP 93911360.1 (Patent No. EP 0596078), Jun. 16, 1999.
United States Patent and Trademark Office, Notice of Allowance, Examiner's Amendment, Examiner Interview Summary Record, U.S. Appl. No. 08/129,894 (Patent No. 5,432,837), Dec. 29, 1994.
United States Patent and Trademark Office, Examiner's Action, U.S. Appl. No. 08/155,061 (Patent No. 5,517,548), Dec. 22, 1994.
Applicant, Amendment (Response to Dec. 22, 1994 Office Action), U.S. Appl. No. 08/155,061 (Patent No. 5,517,548), Jun. 22, 1995.
United States Patent and Trademark Office, Notice of Allowance, U.S. Appl. No. 08/155,061 (Patent No. 5,517,548), Aug. 8, 1995.
European Patent Office, Supplementary European Search Report, Application No. EP 93911361.9 (Patent No. EP 0596079), Mar. 27, 1995.
European Patent Office, Communication, Application No. EP 93911361.9 (Patent No. EP 0596079), Jul. 10, 1998.
Applicant, Response to Jul. 10, 1998 Communication, Application No. EP 93911361.9 (Patent No. EP 0596079), Jan. 20, 1999.
PCT International Search Report, Application No. PCT/US93/04760, Aug. 13, 1993.
United States Patent and Trademark Office, Communication, U.S. Appl. No. 07/886,552, May 21, 1993.
United States Patent and Trademark Office, Office Action Summary and Detailed Action, U.S. Appl. No. 08/802,053, Sep. 30, 1997.
Applicant, Response to Sep. 30, 1997 First Office Action, U.S. Appl. No. 08/802,053, Oct. 20, 1997.
United States Patent and Trademark Office, Office Action Summary and Detailed Action, U.S. Appl. No. 08/802,053, Jan. 5, 1998.
Applicant, Amendment After Final (Jan. 5, 1998 Office Action), U.S. Appl. No. 08/802,053, Feb. 6, 1998.
United States Patent and Trademark Office, Advisory Action, U.S. Appl. No. 08/802,053, Feb. 20, 1998.
Applicant, Appellant's Brief on Appeal, U.S. Appl. No. 08/802,053, May 29, 1998.
United States Patent and Trademark Office, Examiner's Answer, U.S. Appl. No. 08/802,053, Aug. 18, 1998.
United States Patent and Trademark Office, Decision on Appeal, U.S. Appl. No. 08/802,053, Oct. 19, 2001.
United States Patent and Trademark Office, Examiner's Action, U.S. Appl. No. 08/258,044 (Patent No. 5,604,786), Jun. 21, 1995.
Applicant, First Amendment (Response to Jun. 21, 1995 Office Action), U.S. Appl. No. 08/258,044 (Patent No. 5,604,786), Sep. 8, 1995.
United States Patent and Trademark Office, Communication, U.S. Appl. No. 08/258,044 (Patent No. 5,604,786), Dec. 14, 1995.
Applicant, Second Amendment, U.S. Appl. No. 08/258,044 (Patent No. 5,604,786), Jun. 14, 1996.
Applicant, Third Amendment, U.S. Appl. No. 08/258,044 (Patent No. 5,604,786), Jul. 31, 1996.
United States Patent and Trademark Office, Notice of Allowance, U.S. Appl. No. 08/258,044 (Patent No. 5,604,786), Aug. 7, 1996.
United States Patent and Trademark Office, Supplemental Notice of Allowability and Examiner's Amendment, U.S. Appl. No. 08/258,044 (Patent No. 5,604,786), Nov. 18, 1996.
United States Patent and Trademark Office, Communication, U.S. Appl. No. 08/369,205 (Patent No. 5,581,593), Nov. 2, 1995.
Applicant, Amendment (Response to Nov. 2, 1995 Office Action), U.S. Appl. No. 08/369,205 (Patent No. 5,581,593), Feb. 5, 1996.
United States Patent and Trademark Office, Notice of Allowance, Interview Summary, and Examiner's Amendment, U.S. Appl. No. 08/369,205 (Patent No. 5,581,593), May 15, 1996.
PCT International Search Report, Application No. PCT/US96/00282, Apr. 9, 1996.
United States Patent and Trademark Office, Office Action Summary and Detailed Action, U.S. Appl. No. 08/481,852 (Patent No. 5,978,654), Sep. 5, 1996.
Applicant, Amendment (Response to Sep. 5, 1996 Office Action), U.S. Appl. No. 08/481,852 (Patent No. 5,978,654), Nov. 26, 1997.
United States Patent and Trademark Office, Office Action Summary and Detailed Action, U.S. Appl. No. 08/481,852 (Patent No. 5,978,654), Oct. 16, 1998.
Applicant, Response (to Oct. 16, 1998 Office Action), U.S. Appl. No. 08/481,852 (Patent No. 5,978,654), Apr. 16, 1999.
United States Patent and Trademark Office, Notice of Allowance, U.S. Appl. No. 08/481,852 (Patent No. 5,978,654), May 5, 1999.
PCT International Search Report, Application No. PCT/US96/09391, Aug. 27, 1996.
United States Patent and Trademark Office, Office Action Summary and Detailed Action, U.S. Appl. No. 09/288,420 (Patent No. 6,233,314), Feb. 25, 2000.
Applicant, Amendment (Response to Feb. 25, 2000 Office Action) and Terminal Disclaimer, U.S. Appl. No. 09/288,420 (Patent No. 6,233,314), Aug. 25, 2000.
United States Patent and Trademark Office, Notice of Allowance, U.S. Appl. No. 09/288,420 (Patent No. 6,233,314), Dec. 5, 2000.
United States Patent and Trademark Office, Office Action Summary and Detailed Action, U.S. Appl. No. 09/783,337 (Patent No. 6,493,426), Dec. 14, 2001.
Applicant, Response to Dec. 14, 2001 Office Action and Terminal Disclaimer, U.S. Appl. No. 09/783,337 (Patent No. 6,493,426), Jun. 14, 2002.
United States Patent and Trademark Office, Notice of Allowance and Examiner's Statement of Reasons for Allowance, U.S. Appl. No. 09/783,337 (Patent No. 6,493,426), Jul. 25, 2002.
United Kingdom Patent Office, Examination Report, Application No. GB 0319142.6 (Patent No. GB 2389993), Jan. 13, 2004.
Canadian Intellectual Property Office, Examiner's Report, Application No. CA 2,438,412, May 20, 2009.
Applicant, Response to May 20, 2009 Official Action, Application No. CA 2,438,412, Nov. 18, 2009.

(56) References Cited

OTHER PUBLICATIONS

Canadian Intellectual Property Office, Notice of Allowance, Application No. CA 2,438,412, Apr. 30, 2010.
United States Patent and Trademark Office, Notice of Allowance, Examiner's Amendment, Examiner Interview Summary Record, U.S. Appl. No. 07/074,625 (Patent No. 4,777,469), May 20, 1988.
Canadian Patent Office, Notice of Allowance, Application No. CA 571,452 (Patent No. 1,301,388), Jan. 29, 1991.
Applicant, Restoration and Amendment, Application No. CA 571,452 (Patent No. 1,301,388), Aug. 8, 1991.
United States Patent and Trademark Office, Communication, U.S. Appl. No. 07/224,118 (Patent No. 4,897,868), Jun. 8, 1989.
Applicant, Amendment (Response to Jun. 8, 1989 Office Action) and Terminal Disclaimer, U.S. Appl. No. 07/224,118 (Patent No. 4,897,868), Jun. 19, 1989.
United States Patent and Trademark Office, Notice of Allowance, U.S. Appl. No. 07/224,118 (Patent No. 4,897,868), Aug. 29, 1989.
United States Patent and Trademark Office, Communication, U.S. Appl. No. 07/334,003 (Patent No. 4,959,847), Oct. 10, 1989.
Applicant, Amendment (Response to Oct. 10, 1989 Office Action), U.S. Appl. No. 07/334,003 (Patent No. 4,959,847), Jan. 10, 1990.
United States Patent and Trademark Office, Notice of Allowance, U.S. Appl. No. 07/334,003 (Patent No. 4,959,847), Mar. 27, 1990.
United Kingdom Patent Office, Examiner's Search Report, Application No. GB 9006994.9 (Patent No. GB 2,231,468), Jul. 12, 1990.
United Kingdom Patent Office, Examiner's Report, Application No. GB 9006994.9 (Patent No. GB 2,231,468), Dec. 16, 1992.
Applicant, Response to Dec. 16, 1992 Official Letter, Application No. GB 9006994.9 (Patent No. GB 2,231,468), Jun. 11, 1993.
Canadian Intellectual Property Office, Examination Report, Application No. CA 2,013,617, Jul. 28, 2000.
Applicant, Response to Jul. 28, 2000 Official Action, Application No. CA 2,013,617, Nov. 28, 2000.
Applicant, Information Letter, Application No. CA 2,013,617, Feb. 1, 2001.
Canadian Intellectual Property Office, Notice of Allowance, Application No. CA 2,013,617, Mar. 23, 2001.
United States Patent and Trademark Office, Communication, U.S. Appl. No. 07/842,943 (Patent No. 5,351,288), Oct. 22, 1993.
Applicant, Amendment (Response to Oct. 22, 1993 Office Action) and Terminal Disclaimer, U.S. Appl. No. 07/842,943 (Patent No. 5,351,288), Jan. 13, 1994.
United States Patent and Trademark Office, Communication, U.S. Appl. No. 07/842,943 (Patent No. 5,351,288), Mar. 30, 1994.
Applicant, Response to Mar. 30, 1994 Final Rejection, U.S. Appl. No. 07/842,943 (Patent No. 5,351,288), Apr. 12, 1994.
Applicant, Supplemental Response to Final Rejection and Terminal Disclaimer, U.S. Appl. No. 07/842,943 (Patent No. 5,351,288), Apr. 28, 1994.
United States Patent and Trademark Office, Notice of Allowance, U.S. Appl. No. 07/842,943 (Patent No. 5,351,288), Jun. 6, 1994.
United States Patent and Trademark Office, Communication, U.S. Appl. No. 07/255,357, May 3, 1989.
Applicant, Amendment (Response to May 3, 1989 Office Action), U.S. Appl. No. 07/255,357, Aug. 3, 1989.
United States Patent and Trademark Office, Communication, U.S. Appl. No. 07/255,357, Oct. 16, 1989.
Applicant, Amendment (Response to Oct. 16, 1989 Office Action), U.S. Appl. No. 07/255,357, Apr. 16, 1990.
United States Patent and Trademark Office, Communication, U.S. Appl. No. 07/255,357, Jul. 16, 1990.
Applicant, Response After Final, U.S. Appl. No. 07/255,357, Oct. 16, 1990.
United States Patent and Trademark Office, Advisory Action, U.S. Appl. No. 07/255,357, Nov. 6, 1990.
United States Patent and Trademark Office, Examiner's Action, U.S. Appl. No. 07/886,553 (Patent No. 5,325,417), May 21, 1993.
Applicant, First Amendment (Response to May 21, 1993 Office Action), U.S. Appl. No. 07/886,553 (Patent No. 5,325,417), Oct. 21, 1993.
United States Patent and Trademark Office, Notice of Allowance, U.S. Appl. No. 07/886,553 (Patent No. 5,325,417), Jan. 4, 1994.
European Patent Office, Communication, Application No. EP 93911359.3 (Patent No. EP 0608389), Jul. 10, 1998.
Applicant, Response to Jul. 10, 1998 Communication, Application No. EP 93911359.3 (Patent No. EP 0608389), Jan. 19, 1999.
Canadian Intellectual Property Office, Notice of Allowance, Application No. CA 2,113,841, Jun. 10, 2002.
PCT International Search Report, Application No. PCT/US93/04751, Aug. 18, 1993.
United States Patent and Trademark Office, Examiner's Action, U.S. Appl. No. 29/024,266 (Patent No. D364,865), Mar. 30, 1995.
Applicant, Response to First Office Action, U.S. Appl. No. 29/024,266 (Patent No. D364,865), May 16, 1995.
United States Patent and Trademark Office, Notice of Allowance, U.S. Appl. No. 29/024,266 (Patent No. D364,865), Jun. 7, 1995.
United States Patent and Trademark Office, Office Action Summary and Detailed Action, U.S. Appl. No. 29/076,383 (Patent No. D405,793), Apr. 14, 1998.
Applicant, First Amendment (Response to Apr. 14, 1998 Office Action), U.S. Appl. No. 29/076,383 (Patent No. D405,793), Jul. 14, 1998.
United States Patent and Trademark Office, Notice of Allowance and Examiner's Amendment, U.S. Appl. No. 29/076,383 (Patent No. D405,793), Aug. 10, 1998.
Applicant, Preliminary Response to United States Patent and Trademark Office, U.S. Appl. No. 07/616,720 (Patent No. 5,081,673), Dec. 31, 1990.
United States Patent and Trademark Office, Notice of Allowance, U.S. Appl. No. 07/616,720 (Patent No. 5,081,673), Mar. 7, 1991.
Canadian Intellectual Property Office, Notice of Allowance, Patent No. CA 1320602, Oct. 27, 1992.
United States Patent and Trademark Office, Examiner's Action, U.S. Appl. No. 07/886,642 (Patent No. 5,327,479), May 19, 1993.
Applicant, First Amendment (Response to May 19, 1993 Office Action), U.S. Appl. No. 07/886,642 (Patent No. 5,327,479), Oct. 19, 1993.
United States Patent and Trademark Office, Notice of Allowance and Examiner Interview Summary Record, U.S. Appl. No. 07/886,642 (Patent No. 5,327,479), Jan. 5, 1994.
Canadian Intellectual Property Office, Notice of Allowance, Application No. CA 2,113,839, Jun. 18, 2002.
Canadian Intellectual Property Office, Examiner's Report, Application No. CA 2,419,150, Sep. 17, 2009.
Applicant, Response to Sep. 17, 2009 Official Action, Application No. CA 2,419,150, Mar. 12, 2010.
United States Patent and Trademark Office, Office Action Summary and Detailed Action, U.S. Appl. No. 09/938,194 (Patent No. 6,603,835), Jul. 5, 2002.
Applicant, Response (to Jul. 5, 2002 Office Action), U.S. Appl. No. 09/938,194 (Patent No. 6,603,835), Jan. 6, 2003.
United States Patent and Trademark Office, Notice of Allowance, U.S. Appl. No. 09/938,194 (Patent No. 6,603,835), Mar. 18, 2003.
IP Australia, Examiner's First Report, Application No. AU 2002313798, Oct. 27, 2006.
Applicant, Response to Oct. 27, 2006 Examination Report, Application No. AU 2002313798, Feb. 9, 2007.
IP Australia, Notice of Acceptance, Application No. AU 2002313798, Apr. 2, 2007.
Canadian Intellectual Property Office, Examiner's Report, Application No. CA 2,458,372, Oct. 15, 2009.
Applicant, Response to Oct. 15, 2009 Official Action, Application No. CA 2,458,372, Apr. 15, 2010.
Canadian Intellectual Property Office, Notice of Allowance, Application No. CA 2,458,372, Jul. 27, 2010.
United Kingdom Patent Office, Examination Report, Application No. GB 0403994.7, May 28, 2004.
PCT International Search Report, Application No. PCT/US02/26815, Jan. 3, 2003.
PCT Written Opinion, Application No. PCT/US02/26815, Apr. 29, 2003.
PCT International Preliminary Examination Report, Application No. PCT/US02/26815, Apr. 14, 2004.

(56) References Cited

OTHER PUBLICATIONS

United States Patent and Trademark Office, Notice of Allowance and Examiner's Amendment, U.S. Appl. No. 09/956,310 (Patent No. 6,510,206), Aug. 19, 2002.
Applicant, Applicants' Comments on Examiner's Reason for Allowance (dated Aug. 19, 2002), U.S. Appl. No. 09/956,310 (Patent No. 6,510,206), Nov. 19, 2002.
United Kingdom Patent Office, Combined Search and Examination Report, Application No. GB 0406768.2 (Patent No. GB 2396774), Apr. 27, 2004.
PCT International Search Report, Application No. PCT/US01/29130, Mar. 1, 2003.
PCT International Preliminary Examination Report, Application No. PCT/US01/29130, Mar. 17, 2003.
United Kingdom Patent Office, Examination Report, Application No. GB 0306458.1, Sep. 17, 2003.
Applicant, Response to Sep. 17, 2003 Official Letter, Application No. GB 0306458.1, Mar. 16, 2004.
United States Patent and Trademark Office, Office Action Summary and Detailed Action, U.S. Appl. No. 09/977,842 (Patent No. 6,549,611), Apr. 23, 2002.
Applicant, Response (to Apr. 23, 2002 Office Action), U.S. Appl. No. 09/977,842 (Patent No. 6,549,611), Oct. 23, 2002.
Applicant, Terminal Disclaimer, U.S. Appl. No. 09/977,842 (Patent No. 6,549,611), Oct. 23, 2002.
United States Patent and Trademark Office, Notice of Allowance, U.S. Appl. No. 09/977,842 (Patent No. 6,549,611), Nov. 15, 2002.
United States Patent and Trademark Office, Office Action, U.S. Appl. No. 10/412,118, Nov. 3, 2003.
United States Patent and Trademark Office, Office Action Summary and Detailed Action, U.S. Appl. No. 10/316,215 (Patent No. 6,934,366), Jul. 13, 2004.
Applicant, Response (to Jul. 13, 2004 Office Action) and Terminal Disclaimer, U.S. Appl. No. 10/316,215 (Patent No. 6,934,366), Jan. 13, 2005.
United States Patent and Trademark Office, Notice of Allowance and Detailed Action, U.S. Appl. No. 10/316,215 (Patent No. 6,934,366), Apr. 18, 2005.
United States Patent and Trademark Office, Office Action Summary and Detailed Action, U.S. Appl. No. 10/348,466 (Patent No. 6,748,053), Jul. 3, 2003.
Applicant, Response (to Jul. 3, 2003 Office Action) and Terminal Disclaimer, U.S. Appl. No. 10/348,466 (Patent No. 6,748,053), Jan. 5, 2004.
United States Patent and Trademark Office, Notice of Allowance, U.S. Appl. No. 10/348,466 (Patent No. 6,748,053), Jan. 27, 2004.
United States Patent and Trademark Office, Office Action Summary and Detailed Action, U.S. Appl. No. 10/436,650 (Patent No. 7,164,753), Jul. 1, 2005.
Applicant, Amendment (Response to Jul. 1, 2005 Office Action), U.S. Appl. No. 10/436,650 (Patent No. 7,164,753), Sep. 14, 2005.
United States Patent and Trademark Office, Office Action Summary and Detailed Action, U.S. Appl. No. 10/436,650 (Patent No. 7,164,753), Nov. 17, 2005.
Applicant, Response (to Nov. 17, 2005 Office Action), U.S. Appl. No. 10/436,650 (Patent No. 7,164,753), Jan. 18, 2006.
United States Patent and Trademark Office, Office Action Summary and Detailed Action, U.S. Appl. No. 10/436,650 (Patent No. 7,164,753), Apr. 19, 2006.
Applicant, Response (to Apr. 19, 2006 Office Action), U.S. Appl. No. 10/436,650 (Patent No. 7,164,753), Jun. 13, 2006.
United States Patent and Trademark Office, Notice of Allowance and Detailed Action, U.S. Appl. No. 10/436,650 (Patent No. 7,164,753), Sep. 15, 2006.
IP Australia, Examiner's First Report, Application No. AU 2004239790, May 14, 2009.
Applicant, Response (to May 14, 2009 Examination Report), Application No. AU 2004239790, May 21, 2010.
Government of India the Patent Office, First Examination Report, Application No. 2262/KOLNP/2005, Apr. 29, 2008.
Applicant, Response to Apr. 29, 2008 Official Letter, Application No. 2262/KOLNP/2005, May 5, 2008.
Applicant, Response to Apr. 29, 2008 First Examination Report, Application No. 2262/KOLNP/2005, Oct. 23, 2008.
PCT International Preliminary Report on Patentability, Application No. PCT/US2004/014991, Dec. 1, 2005.
PCT International Search Report and Written Opinion, Application No. PCT/US2004/014991, Dec. 29, 2004.
Intellectual Property Philippines, Official Action, Application No. PH 12005502024, Aug. 10, 2007.
Applicant, Response to Aug. 10, 2007 Official Action, Application No. PH 12005502024, Oct. 3, 2007.
Intellectual Property Philippines, Official Action, Application No. PH 12005502024, Oct. 17, 2007.
Applicant, Response to Oct. 17, 2007 Official Action, Application No. PH 12005502024, Dec. 11, 2007.
United States Patent and Trademark Office, Office Action Summary and Detailed Action, U.S. Appl. No. 10/619,040 (Patent No. 7,006,604), Dec. 2, 2004.
Applicant, Response (to Dec. 2, 2004 Office Action) and Terminal Disclaimer, U.S. Appl. No. 10/619,040 (Patent No. 7,006,604), Jun. 2, 2005.
United States Patent and Trademark Office, Notice of Allowance, U.S. Appl. No. 10/619,040 (Patent No. 7,006,604), Sep. 16, 2005.
United States Patent and Trademark Office, Supplemental Notice of Allowability, Examiner's Amendment and Interview Summary, U.S. Appl. No. 10/628,193 (Patent No. 6,885,731), Jan. 31, 2005.
United States Patent and Trademark Office, Office Action Summary and Detailed Action, U.S. Appl. No. 10/634,965 (Patent No. 7,003,082), Jul. 16, 2004.
Applicant, Response (to Jul. 16, 2004 Office Action) and Terminal Disclaimer, U.S. Appl. No. 10/634,965 (Patent No. 7,003,082), Jan. 14, 2005.
United States Patent and Trademark Office, Supplemental Notice of Allowability, U.S. Appl. No. 10/634,965 (Patent No. 7,003,082), Nov. 9, 2005.
United States Patent and Trademark Office, Office Action Summary and Detailed Action, U.S. Appl. No. 11/061,682 (Patent No. 7,660,398), Apr. 1, 2008.
Applicant, Amendment (Response to Apr. 1, 2008 Office Action), U.S. Appl. No. 11/061,682 (Patent No. 7,660,398), Jul. 1, 2008.
United States Patent and Trademark Office, Office Action Summary and Detailed Action, U.S. Appl. No. 11/061,682 (Patent No. 7,660,398), Nov. 4, 2008.
Applicant, Request for Continued Examination and Interview Summary, U.S. Appl. No. 11/061,682 (Patent No. 7,660,398), Jan. 22, 2009.
United States Patent and Trademark Office, Office Action Summary and Detailed Action, U.S. Appl. No. 11/061,682 (Patent No. 7,660,398), Mar. 25, 2009.
Applicant, Amendment, U.S. Appl. No. 11/061,682 (Patent No. 7,660,398), Jun. 22, 2009.
United States Patent and Trademark Office, Notice of Allowance, U.S. Appl. No. 11/061,682 (Patent No. 7,660,398), Sep. 25, 2009.
Applicant, Request for Recalculation of Patent Term Adjustment in View of Wyeth, Patent No. 7,660,398, (U.S. Appl. No. 11/061,682), Feb. 25, 2010.
United States Patent and Trademark Office, Decision on Request for Recalculation of Patent Term Adjustment in View of Wyeth and Notice of Intent to Issue Certificate of Correction, Patent No. 7,660,398 (U.S. Appl. No. 11/061,682), Apr. 20, 2010.
United States Patent and Trademark Office, Certificate of Correction, Patent No. 7,660,398 (U.S. Appl. No. 11/061,682), Nov. 30, 2010.
PCT International Search Report and Written Opinion, Application No. PCT/US2005/005149, May 24, 2005.
PCT International Preliminary Report on Patentability, Application No. PCT/US2005/005149, Aug. 31, 2006.
UK Intellectual Property Office, Examination Report, Application No. GB 0617585.5, Jan. 23, 2008.
Applicant, Response to Jan. 23, 2008 Official Letter, Application No. GB 0617585.5, Jul. 22, 2008.
UK Intellectual Property Office, Combined Search and Examination Report, Application No. GB 0617585.5, Aug. 15, 2008.

(56) References Cited

OTHER PUBLICATIONS

Applicant, Response to Aug. 15, 2008 Official Letter, Application No. GB 0617585.5, Dec. 9, 2008.
UK Intellectual Property Office, Combined Search and Examination Report, Application No. GB 0813502.2, Aug. 15, 2008.
Applicant, Response to Aug. 15, 2008 Official Letter, Application No. GB 0813502.2, Dec. 9, 2008.
United States Patent and Trademark Office, Office Action Summary and Detailed Action, U.S. Appl. No. 11/257,703 (Patent No. 7,319,740), May 3, 2007.
Applicant, Amendment and Terminal Disclaimers (Response to May 3, 2007 Office Action), U.S. Appl. No. 11/257,703 (Patent No. 7,319,740), Jul. 26, 2007.
United States Patent and Trademark Office, Notice of Allowance, Application No. 11/257,703 (Patent No. 7,319,740), Aug. 23, 2007.
United States Patent and Trademark Office, Office Action Summary and Detailed Action, U.S. Appl. No. 08/217,518 (Patent No. 5,724,405), Jul. 20, 1995.
Applicant, Amendment (Response to Jul. 20, 1995 Office Action), U.S. Appl. No. 08/217,518 (Patent No. 5,724,405), Jan. 22, 1996.
United States Patent and Trademark Office, Office Action Summary and Detailed Action, U.S. Appl. No. 08/217,518 (Patent No. 5,724,405), Apr. 16, 1996.
Applicant, Amendment (Response to Apr. 16, 1996 Office Action) and Terminal Disclaimer, U.S. Appl. No. 08/217,518 (Patent No. 5,724,405), Oct. 16, 1996.
United States Patent and Trademark Office, Office Action Summary and Detailed Action, U.S. Appl. No. 08/217,518 (Patent No. 5,724,405), Jan. 15, 1997.
Applicant, Response After Final (Response to Jan. 15, 1997 Office Action) and Terminal Disclaimer, U.S. Appl. No. 08/217,518 (Patent No. 5,724,405), Jul. 15, 1997.
United States Patent and Trademark Office, Notice of Allowability, U.S. Appl. No. 08/217,518 (Patent No. 5,724,405), Aug. 19, 1997.
United Kingdom Patent Office, Search Report, Application No. GB 9804556.0 (Patent No. GB 2335109), Aug. 12, 1998.
United Kingdom Patent Office, Examination Report, Application No. GB 9804556.0 (Patent No. GB 2335109), Sep. 27, 2002.
Applicant, Response to United Kingdom Patent Office Sep. 27, 2002 Examination Report, Application No. GB 9804556.0 (Patent No. GB 2335109), Mar. 26, 2003.
United States Patent and Trademark Office, Notice of Allowability, U.S. Appl. No. 08/925,558 (Patent No. 5,909,482), Oct. 27, 1998.
United Kingdom Patent Office, Examination Report, Application No. GB 9908312.3 (Patent No. GB 2334177), Apr. 15, 2002.
Applicant, Response to United Kingdom Patent Office Apr. 15, 2002 Examination Report, Application No. GB 9908312.3 (Patent No. GB 2334177), Oct. 14, 2002.
PCT International Search Report, Application No. PCT/US98/18650, Nov. 6, 1998.
Canadian Intellectual Property Office, Examination Report, Application No. CA 2,268,582, Feb. 22, 2007.
Applicant, Amendment/Remarks Following Feb. 22, 2007 Examiner's Report, Application No. CA 2,268,582, Aug. 22, 2007.
Applicant, First Amendment (in Response to United States Patent and Trademark Office Nov. 8, 2012 Office Action), U.S. Appl. No. 12/686,688, Feb. 7, 2013.
United States Patent and Trademark Office Before the Patent Trial and Appeal Board, Decision—Institution of Inter Partes Review, *CaptionCall LLC* v. *Ultratec Inc.*, Case IPR2013-00550, Patent 7,003,082 B2, Mar. 5, 2014, 13 pages.
United States Patent and Trademark Office Before the Patent Trial and Appeal Board, Decision—Institution of Inter Partes Review, *CaptionCall LLC* v. *Ultratec Inc.*, Case IPR2013-00543, Patent 7,555,104, Mar. 5, 2014, 16 pages.
United States Patent and Trademark Office Before the Patent Trial and Appeal Board, Decision—Institution of Inter Partes Review, *CaptionCall LLC* v. *Ultratec Inc.*, Case IPR2013-00540, Patent 6,233,314, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00545, Patent 6,594,346, Mar. 5, 2014, 21 pages.
United States Patent and Trademark Office Before the Patent Trial and Appeal Board, Decision—Institution of Inter Partes Review, *CaptionCall LLC* v. *Ultratec Inc.*, Case IPR2013-00541, Patent 5,909,482, Mar. 5, 2014, 32 pages.
United States Patent and Trademark Office Before the Patent Trial and Appeal Board, Decision—Institution of Inter Partes Review, *CaptionCall LLC* v. *Ultratec Inc.*, Case IPR2013-00544, Patent 8,213,578, Mar. 5, 2014, 22 pages.
United States Patent and Trademark Office Before the Patent Trial and Appeal Board, Decision—Institution of Inter Partes Review, *CaptionCall LLC* v. *Ultratec Inc.*, Case IPR2013-00542, Patent 7,319,740, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00549, Patent 6,603,835 B2, Mar. 5, 2014, 26 pages.
Ultratec Inc. and Captel Inc., Complaint for Patent Infringement, *Ultratec Inc. and CapTel Inc.* v. *Sorenson Communications Inc. and CaptionCall LLC*, Civil Action No. 13-346, May 17, 2013, 13 pages.
Ultratec Inc. and Captel Inc., Amended Complaint for Patent Infringement and Declaratory Judgment, *Ultratec Inc. and CapTel Inc.* v. *Sorenson Communications Inc. and CaptionCall LLC*, Civil Action No. 13-346, Jul. 31, 2013, 16 pages.
Sorenson Communications Inc. and Captioncall LLC, Defendants' Amended Answer to Plaintiffs' Amended Complaint for Patent Infringement and Declaratory Judgment and Counterclaims, *Ultratec Inc. and CapTel Inc.* v. *Sorenson Communications Inc. and CaptionCall LLC*, Civil Action No. 13-346, Aug. 14, 2013, 71 pages.
Ultratec Inc. and Captel Inc., Plaintiffs' Answer to Defendants' Amended Counterclaims, *Ultratec Inc. and CapTel Inc.* v. *Sorenson Communications Inc. and CaptionCall LLC*, Civil Action No. 13-346, Aug. 28, 2013, 26 pages.
Sorenson Communications Inc. and Captioncall LLC, Invalidity Contentions, *Ultratec Inc. and CapTel Inc.* v. *Sorenson Communications Inc. and CaptionCall LLC*, Civil Action No. 13-346, Sep. 23, 2013, 31 pages.
Sorenson Communications Inc. and Captioncall LLC, Exhibits to Invalidity Contentions, *Ultratec Inc. and CapTel Inc.* v. *Sorenson Communications Inc. and CaptionCall LLC*, Civil Action No. 13-346, Sep. 23, 2013, 587 pages.
Sorenson Communications Inc. and Captioncall LLC, Defendants' Answer to Plaintiffs' Original Complaint for Patent Infringement and Counterclaims, *Ultratec Inc. and CapTel Inc.* v. *Sorenson Communications Inc. and CaptionCall LLC*, Civil Action No. 14-66, Feb. 24, 2014, 41 pages.
Ultratec Inc. and CapTel Inc., Plaintiffs' Answer to Defendants' Counterclaims, *Ultratec Inc. and CapTel Inc.* v. *Sorenson Communications Inc. and CaptionCall LLC*, Civil Action No. 14-CV-66, Mar. 17, 2014, 14 pages.
Ultratec Inc. and CapTel Inc., Amended Complaint for Patent Infringement, *Ultratec Inc. and CapTel Inc.* v. *Sorenson Communications Inc. and CaptionCall LLC*, Civil Action No. 3-14-CV-66-BBC, Mar. 26, 2014, 11 pages.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education Conference, 1993, 23rd Annual Conference 'Engineering Education: Renewing America's Technology' Proceedings, IEEE, pp. 92-97.

(56) References Cited

OTHER PUBLICATIONS

IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35 (5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
U.S. Patent and Trademark Office, File Wrapper, U.S. Appl. No. 08/396,554, Telephone for the Deaf and Method of Using Same, Filed Mar. 1, 1995, 121 pages.
U.S. Patent and Trademark Office, Portion of File Wrapper, U.S. Appl. No. 09/599,347, filed Jun. 22, 2000, 19 pages.
U.S. Patent and Trademark Office, Portion of File Wrapper, U.S. Appl. No. 10/099,824, Graphic User Interface for a Patient Ventilator, Filed Mar. 15, 2002, 3 pages.
U.S. Patent and Trademark Office, File Wrapper, U.S. Appl. No. 60/041,458, TTY Modem System, Filed Mar. 25, 1997, 32 pages.
The Patent Office, Examination Report, Apr. 15, 2002, Application No. GB 9908312.3, 2 pages.
Applicant, Response to Apr. 15, 2002 Examination Report, Oct. 14, 2002, Application No. GB 9908312.3, 2 pages.
CaptionCall L.L.C. Petition for Inter Partes Review of Claims 1 and 2 of U.S. Patent No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Patent No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Patent No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Patent No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Patent No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Patent No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Patent No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Patent No. 7,319,740 Under 35 U.S.C. 311-319 and 37 C.F.R. 42.100 Et Seq., Aug. 30, 2013, 67 pages.
CaptionCall L.L.C. Petition for Inter Partes Review of Claims 6 and 8 of U.S. Patent No. 6,603,835 Under 35 U.S.C. 311-319 and 37 C.F.R. 42.100 Et Seq., May 19, 2014, 67 pages.
Declaration of Paul W. Ludwick, In Re: U.S. Patent 6,594,346, Case IPR2013-00545, In The United States Patent and Trademark Office Before the Patent Trial and Appeal Board, May 11, 2014.
Declaration of Paul W. Ludwick, In Re: U.S. Patent 7,555,104, Case IPR2013-00542 and IPR2013-00543, In The United States Patent and Trademark Office Before the Patent Trial and Appeal Board, May 12, 2014.
Declaration of Paul W. Ludwick, In Re: U.S. Patent 7,319,740, Case IPR2013-00542 and IPR2013-00543, In The United States Patent and Trademark Office Before the Patent Trial and Appeal Board, May 12, 2014.
Declaration of Paul W. Ludwick, In Re: U.S. Patent 6,233,314, Case IPR2013-00540, In The United States Patent and Trademark Office Before the Patent Trial and Appeal Board, May 30, 2014.
Declaration of Paul W. Ludwick, In Re: U.S. Patent 5,909,482, Case IPR2013-00541, In The United States Patent and Trademark Office Before the Patent Trial and Appeal Board, May 30, 2014.
Declaration of Paul W. Ludwick, In Re: U.S. Patent 8,213,578, Case IPR2013-00544, In The United States Patent and Trademark Office Before the Patent Trial and Appeal Board, May 30, 2014.
Declaration of Paul W. Ludwick Regarding Secondary Considerations of Non-Obviousness, In Re: U.S. Patent 7,555,104, Case IPR2013-00543, In The United States Patent and Trademark Office Before the Patent Trial and Appeal Board, May 12, 2014.
Declaration of Paul W. Ludwick Regarding Secondary Considerations of Non-Obviousness, In Re: U.S. Patent 7,319,740, Case IPR2013-00542, In The United States Patent and Trademark Office Before the Patent Trial and Appeal Board, May 12, 2014.
Declaration of Paul W. Ludwick Regarding Secondary Considerations of Non-Obviousness, In Re: U.S. Patent 6,603,835, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Patent 6,594,346, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Patent 6,233,314, Case IPR2013-00540, In The United States Patent and Trademark Office Before the Patent Trial and Appeal Board, May 30, 2014.
Declaration of Paul W. Ludwick Regarding Secondary Considerations of Non-Obviousness, In Re: U.S. Patent 5,909,482, Case

(56) References Cited

OTHER PUBLICATIONS

IPR2013-00541, In The United States Patent and Trademark Office Before the Patent Trial and Appeal Board, May 30, 2014.
Declaration of Paul W. Ludwick Regarding Secondary Considerations of Non-Obviousness, In Re: U.S. Patent 8,213,578, Case IPR2013-00544, In The United States Patent and Trademark Office Before the Patent Trial and Appeal Board, May 30, 2014.
Declaration of Kelby Brick, Esq., CDI, In Re: U.S. Patent 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Patent 7,003,082, Case IPR2013-00550, In The United States Patent and Trademark Office Before the Patent Trial and Appeal Board, Jul. 7, 2014.
Supplemental Declaration of Benedict J. Occhiogrosso, In Re: U.S. Patent 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Patent 6,594,346, Case IPR2013-00545, In The United States Patent and Trademark Office Before the Patent Trial and Appeal Board, Jul. 7, 2014.
Supplemental Declaration of Benedict J. Occhiogrosso, In Re: U.S. Patent 6,603,835, Case IPR2013-00549, In The United States Patent and Trademark Office Before the Patent Trial and Appeal Board, Jul. 7, 2014.
Supplemental Declaration of Benedict J. Occhiogrosso, In Re: U.S. Patent 7,319,740, Case IPR2013-00542, In The United States Patent and Trademark Office Before the Patent Trial and Appeal Board, Jul. 7, 2014.
Supplemental Declaration of Benedict J. Occhiogrosso, In Re: U.S. Patent 6,233,314, Case IPR2013-00540, In The United States Patent and Trademark Office Before the Patent Trial and Appeal Board, Jul. 7, 2014.
Supplemental Declaration of Benedict J. Occhiogrosso, In Re: U.S. Patent 5,909,482, Case IPR2013-00541, In The United States Patent and Trademark Office Before the Patent Trial and Appeal Board, Jul. 7, 2014.
Supplemental Declaration of Benedict J. Occhiogrosso, In Re: U.S. Patent 8,213,578, Case IPR2013-00544, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 7,003,082, Case IPR2013-00550, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 6,594,346, Case IPR2013-00545, In The United States Patent and Trademark Office Before the Patent Trial and Appeal Board, Jul. 7, 2014
Petitioners Reply to Patent Owner's Response Under 37 C.F.R. 42.23, In Re: U.S. Patent 8,213,578, Case IPR2013-00544, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 7,555,104, Case IPR2013-00543, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 5,909,482, Case IPR2013-00541, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 7,319,740, Case IPR2013-00542, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 6,233,314, Case IPR2013-00540, In The United States Patent and Trademark Office Before the Patent Trial and Appeal Board, Jul. 7, 2014.
Petitioners Reply to Patent Owner's Response Under 37 C.F.R. 42.23, In Re: U.S. Patent 6,603,835, Case IPR2013-00549, In The United States Patent and Trademark Office Before the Patent Trial and Appeal Board, Jul. 7, 2014.
Decision, CaptionCall's Request for Rehearing, In Re: U.S. Patent 6,603,835, Case IPR2013-00549, In The United States Patent and Trademark Office Before the Patent Trial and Appeal Board, Apr. 28, 2014.
Expert Report of Brenda Battat Regarding Secondary Considerations Related to Plaintiffs' Patents-In-Suit, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].
Expert Report of Mr. Benedict J. Occhiogrosso Regarding Invalidity of Asserted Claims of U.S. Patent Nos. 5,909,482; 6,233,314; 6,594,346; 6,603,835; 7,003,082; 7,319,740; 7,555,104; and 8,213,578, *Ultratec, Inc., et al. v. Sorenson Communications, Inc., et al.*, Civil Action No. 3:13-CV-346-BBC, May 30, 2014 [Redacted—Public Version].
Expert Report of Constance Phelps Regarding Secondary Considerations Related to Plaintiffs' Patents-In-Suit, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].
Validity Report of Paul W. Ludwick Under Rule 26(a)(2)(B) of the Federal Rules of Civil Procedure Regarding U.S. Patent Nos. 5,909,482; 6,233,314; 6,594,346; and 8,213,578, *Ultratec, Inc., et al. v. Sorenson Communications, Inc., et al.*, Civil Action No. 3:13-CV-346-BBC, United States District Court, Western District of Wisconsin, Apr. 22, 2014 [Redacted].
Validity Report of James A. Steel, Jr. Regarding U.S. Patent Nos. 6,603,835; 7,003,082; 7,319,740; and 7,555,104, in Response to Expert Report of Benedict Occhiogrosso and Non-Infringement Report Regarding U.S. Patent No. 8,379,801, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].
Brief in Support of Defendants Sorenson Communications, Inc. and CaptionCall, LLC's Motion for Partial Summary Judgment, *Ultratec, Inc., et al. v. Sorenson Communications, Inc., et al.*, Civil Action No. 3:13-CV-346-BBC, United States District Court, Western District of Wisconsin, Apr. 17, 2014 [Redacted].
[Corrected] Brief in Support of Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, Apr. 23, 2014 [Redacted].
Plaintiffs Ultratec, Inc. and Captel, Inc.'s Brief in Opposition to Defendants' Motion for Partial Summary Judgment—Willfulness, *Ultratec, Inc., et al. v. Sorenson Communications, Inc., et al.*, Civil Action No. 3:13-CV-346-BBC, United States District Court, Western District of Wisconsin, May 12, 2014.
Declaration of Benedict J. Occhiogrosso in Support of Defendants' Opposition to Plaintiffs' Motion for Partial Summary Judgment, *Ultratec, Inc., et al. v. Sorenson Communications, Inc., et al.*, Civil Action No. 3:13-CV-346-BBC, United States District Court, Western District of Wisconsin, May 12, 2014.
Response in Opposition to Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, May 12, 2014 [Redacted—Public Version].
Declaration of Robert M. Engelke in Support of Plaintiffs' Response to Defendants' Motion for Partial Summary Judgment, *Ultratec, Inc., et al. v. Sorenson Communications, Inc., et al.*, Civil Action No. 3:13-CV-346-BBC, United States District Court, Western District of Wisconsin, May 12, 2014 [Redacted].
Defendants' Reply in Support of Their Motion for Partial Summary Judgment, *Ultratec, Inc., et al. v. Sorenson Communications, Inc., et al.*, Civil Action No. 3:13-CV-346-BBC, United States District Court, Western District of Wisconsin, May 22, 2014 [Redacted].
Reply Brief in Support of Plaintiffs' Motion for Partial Summary Judgment of Infringement and Validity, *Ultratec, Inc., et al. v.*

(56) References Cited

OTHER PUBLICATIONS

*Sorenson Communications, Inc., et al.*, Civil Action No. 3:13-CV-346-BBC, United States District Court, Western District of Wisconsin, May 22, 2014 [Redacted—Public Version].
Sorenson Communications, Inc. and CaptionCall, LLC's Invalidity Contentions and Exhibits, *Ultratec, Inc., et al.* v. *Sorenson Communications, Inc., et al.*, Civil Action No. 14-CV-66-BBC, United States District Court, Western District of Wisconsin, Jul. 16, 2014.
Sorenson Communications, Inc. and CaptionCall, LLC's Invalidity Contentions and Exhibits, *Ultratec, Inc., et al.* v. *Sorenson Communications, Inc., et al.*, Civil Action No. 14-CV-66-BBC, United States District Court, Western District of Wisconsin, May 16, 2014.
Canadian Intellectual Property Office, Examiner's Report, Application No. CA 2,613,363, Oct. 1, 2012.
Applicant, Response to Examiner's Report, Application No. CA 2,613,363, Mar. 7, 2013.
Canadian Intellectual Property Office, Notice of Allowance, Application No. CA 2,613,363, Oct. 18, 2013.
Government of India Patent Office, First Examination Report, Application No. IN 4970/KOLNP/2007, Feb. 26, 2014.
Canadian Intellectual Property Office, Examiner's Report, Application No. CA 2,556,933, Apr. 10, 2012.
Applicant, Response to Official Action, Application No. C 2,556,933, Jul. 12, 2012.
Canadian Intellectual Property Office, Notice of Allowance, Application No. CA 2,556,933, Feb. 14, 2013.
PCT International Search Report and Written Opinion, PCT/US2009/040523, Nov. 11, 2009.
Canadian Intellectual Property Office, Examiner's Report, Application No. CA 2,761,343, Mar. 8, 2012.
Applicant, Response to Official Action, Application No. CA 2,761,343, Mar. 30, 2012.
Canadian Intellectual Property Office, Notice of Allowance, Application No. CA 2,761,343, Jul. 24, 2012.
United States Patent and Trademark Office, Office Action Summary and Detailed Action, U.S. Appl. No. 11/955,476, Jan. 24, 2011.
Applicant, Amendment (Response to Jan. 24, 2011, Office Action) and Terminal Disclaimers, U.S. Appl. No. 11/955,476, May 23, 2011.
United States Patent and Trademark Office, Office Action Summary and Detailed Action, U.S. Appl. No. 11/955,476, Jun. 23, 2011.
Applicant, Amendment Submitted with a Request for Continued Examination and Terminal Disclaimers, U.S. Appl. No. 11/955,476, Oct. 19, 2011.
United States Patent and Trademark Office, Notice of Allowance, U.S. Appl. No. 11/955,476, Mar. 2, 2012.
United States Patent and Trademark Office, Office Action Summary and Detailed Action, U.S. Appl. No. 13/486,221, Sep. 13, 2013.
Applicant, Amendment (Response to Sep. 13, 2013, Office Action), U.S. Appl. No. 13/486,221, Mar. 11, 2014.
United States Patent and Trademark Office, Office Action Summary and Detailed Action, U.S. Appl. No. 13/486,221, Mar. 26, 2014.
Applicant, Terminal Disclaimers and Remarks, U.S. Appl. No. 13/486,221, Apr. 30, 2014.
United States Patent and Trademark Office, Office Action Summary and Detailed Action, U.S. Appl. No. 13/486,221, Jun. 25, 2014.
United States Patent and Trademark Office, Office Action Summary and Detailed Action, U.S. Appl. No. 13/950,860, Jan. 9, 2014.
Applicant, Amendment (Response to Jan. 9, 2014, Office Action), U.S. Appl. No. 13/950,860, Jun. 30, 2014.
Declaration of Benedict J. Occhiogrosso, In Re: U.S. Patent 7,003,082, United States Patent and Trademark Office Before The Patent Trial and Appeal Board, Aug. 30, 2013.
Declaration of Benedict J. Occhiogrosso, In Re: U.S. Patent 6,603,835, United States Patent and Trademark Office Before The Patent Trial and Appeal Board, Aug. 30, 2013.
Declaration of Benedict J. Occhiogrosso, In Re: U.S. Patent 6,233,314, United States Patent and Trademark Office Before The Patent Trial and Appeal Board, Aug. 30, 2013.
Declaration of Benedict J. Occhiogrosso, In Re: U.S. Patent 5,909,482, United States Patent and Trademark Office Before The Patent Trial and Appeal Board, Aug. 30, 2013.
Declaration of Benedict J. Occhiogrosso, In Re: U.S. Patent 7,319,740, United States Patent and Trademark Office Before The Patent Trial and Appeal Board, Aug. 30, 2013.
Declaration of Benedict J. Occhiogrosso, In Re: U.S. Patent 6,594,346, United States Patent and Trademark Office Before The Patent Trial and Appeal Board, Aug. 30, 2013.
Declaration of Benedict J. Occhiogrosso, In Re: U.S. Patent 7,555,104, United States Patent and Trademark Office Before The Patent Trial and Appeal Board, Aug. 30, 2013.
Declaration of Benedict J. Occhiogrosso, In Re: U.S. Patent 8,213,578, United States Patent and Trademark Office Before The Patent Trial and Appeal Board, Aug. 30, 2013.
Request for Rehearing Under 37 C.F.R. 42.71(d), In Re: U.S. Patent 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Patent.6,594,346, Case IPR2013-00545, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Patent 7,003,082, Case IPR2013-00550, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Patent 7,555,104, Case IPR2013-00543, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Patent 7,319,740, Case IPR2013-00542, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Patent 6,603,835, Case IPR2013-00549, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Patent 8,213,578, Case IPR2013-00544, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Patent 5,909,482, Case IPR2013-00541, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Patent 6,233,314, Case IPR2013-00540, In The United States Patent and Trademark Office Before the Patent Trial and Appeal Board, May 30, 2014.
Declaration of Brenda Battat, In Re: U.S. Patent 8,231,578, Case IPR2013-00544, In The United States Patent and Trademark Office Before the Patent Trial and Appeal Board, May 8, 2014.
Declaration of Constance Phelps, In Re: U.S. Patent 6,233,314, Case IPR2013-00540, In The United States Patent and Trademark Office Before the Patent Trial and Appeal Board, May 9, 2014.
Declaration of Benedict J. Occhiogrosso, In Re: U.S. Patent 6,603,835, United States Patent and Trademark Office Before the Patent Trial and Appeal Board, May 19, 2014.
Declaration of James A. Steel, Jr., In Re: U.S. Patent 7,319,740, Case IPR2013-00542, United States Patent and Trademark Office Before the Patent Trial and Appeal Board, May 10, 2014.
Declaration of James A. Steel, Jr., In Re: U.S. Patent 7,003,082, Case IPR2013-00550, United States Patent and Trademark Office Before the Patent Trial and Appeal Board, May 10, 2014.
Declaration of James A. Steel, Jr., In Re: U.S. Patent 6,603,835, Case IPR2013-00549, United States Patent and Trademark Office Before the Patent Trial and Appeal Board, May 11, 2014.
Declaration of James A. Steel, Jr., In Re: U.S. Patent 7,555,104, Case IPR2013-00543, United States Patent and Trademark Office Before the Patent Trial and Appeal Board, May 12, 2014.

(56) References Cited

OTHER PUBLICATIONS

Opinion and Order, *Ultratec, Inc., et al.* v. *Sorenson Communications, Inc., et al.*, Civil Action No. 13-CV-346-BBC, United States District Court, Western District of Wisconsin, Aug. 28, 2014.
CaptionCall L.L.C. Petition for Inter Partes Review of Claims 11-13 of U.S. Patent No. 7,660,398 Under 35 U.S.C. 311-319 and 37 C.F.R. 42.100 Et Seq., Aug. 13, 2014, 64 pages.
Prosecution History of the 7,660,398 U.S. Patent, 489 pages.
Vaseghi, Chapter 14: Echo Cancellation, Advanced Digital Signal Processing and Noise Reduction, Second Edition, John Wiley & Sons, Ltd., 2000, pp. 396-415.
Ultratec, Inc. and CapTel, Inc. Complaint for Patent Infringement, *Ultratec, Inc. and CapTel Inc.* v. *Sorenson Communications, Inc. and CaptionCall, LLC*, Civil Action No. 14-CV-66, Feb. 3, 2014, 9 pages.
Plaintiffs, Ultratec, Inc. and CapTel, Inc.'s Infringement Contentions, *Ultratec, Inc. and CapTel Inc.* v. *Sorenson Communications, Inc. and CaptionCall, LLC*, Civil Action No. 14-CV-66, Mar. 28, 2014, 9 pages.
Declaration of Benedict J. Occhiogrosso, In Re: U.S. Patent 7,660,398, United States Patent and Trademark Office Before the Patent Trial and Appeal Board, Aug. 13, 2014, 62 pages.
CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 28, 2015, 65 pages.
In the United States Patent and Trademark Office Before the Patent Trial and Appeal Board, Decision—Institution of Inter Partes Review, *CaptionCall LLC* v. *Ultratec Inc.*, Case IPR2014-00780, Patent 6,603,835, Dec. 4, 2014, 14 pages.
In the United States Patent and Trademark Office Before the Patent Trial and Appeal Board, Patent Owner Response Under 37 C.F.R. 42.120, *CaptionCall LLC* v. *Ultratec Inc.*, Case IPR2014-00780, Patent 6,603,835, Feb. 11, 2015, 68 pages.
Ultratec Inc. And Captel Inc., Amended Complaint for Patent Infringement, *Ultratec, Inc., et al.* v. *Sorenson Communications, Inc., et al.*, Civil Action No. 3:14-cv-847-JDP, United States District Court, Western District of Wisconsin, Dec. 23, 2014, 15 pages.
Sorenson Communications Inc. And Captioncall LLC, Defendants' First Amended Answer to Plaintiffs' Amended Complaint for Patent Infringement and Counterclaims, Civil Action No. 3:14-cv-847-JDP, United States District Court, Western District of Wisconsin, Feb. 20, 2015, 41 pages.
In the United States Patent and Trademark Office Before the Patent Trial and Appeal Board, Final Written Decision, *CaptionCall LLC* v. *Ultratec Inc.*, Case IPR2014-00540, Patent 6,233,314, Mar. 3, 2015, 55 pages.
In the United States Patent and Trademark Office Before the Patent Trial and Appeal Board, Final Written Decision, *CaptionCall LLC* v. *Ultratec Inc.*, Case IPR2014-00541, Patent 5,909,482, Mar. 3, 2015, 77 pages.
In the United States Patent and Trademark Office Before the Patent Trial and Appeal Board, Final Written Decision, *CaptionCall LLC* v. *Ultratec Inc.*, Case IPR2014-00542, Patent 7,319,740, Mar. 3, 2015, 31 pages.
In the United States Patent and Trademark Office Before the Patent Trial and Appeal Board, Final Written Decision, *CaptionCall LLC* v. *Ultratec Inc.*, Case IPR2014-00543, Patent 7,555,104, Mar. 3, 2015, 29 pages.
In the United States Patent and Trademark Office Before the Patent Trial and Appeal Board, Final Written Decision, *CaptionCall LLC* v. *Ultratec Inc.*, Case IPR2014-00544, Patent 8,213,578, Mar. 3, 2015, 56 pages.
In the United States Patent and Trademark Office Before the Patent Trial and Appeal Board, Final Written Decision, *CaptionCall LLC* v. *Ultratec Inc.*, Case IPR2014-00545, Patent 6,594,346, Mar. 3, 2015, 41 pages.
In the United States Patent and Trademark Office Before the Patent Trial and Appeal Board, Final Written Decision, *CaptionCall LLC* v. *Ultratec Inc.*, Case IPR2014-00549, Patent 6,603,835, Mar. 3, 2015, 35 pages.
In the United States Patent and Trademark Office Before the Patent Trial and Appeal Board, Final Written Decision, *CaptionCall LLC* v. *Ultratec Inc.*, Case IPR2014-00550, Patent 7,003,082, Mar. 3, 2015, 25 pages.
United States Patent and Trademark Office, Office Action Summary and Detailed Action, U.S. Appl. No. 13/486,221, Jan. 28, 2015, 8 pages.
United States Patent and Trademark Office, Office Action Summary and Detailed Action, U.S. Appl. No. 14/506,080, Feb. 27, 2015, 7 pages.
United States Patent and Trademark Office, Office Action Summary and Detailed Action, U.S. Appl. No. 14/299,531, Sep. 19, 2014, 8 pages.
Applicant, Amendment (Response to Sep. 19, 2014, Office action), U.S. Appl. No. 14/299,531, Sep. 24, 2014, 12 pages.
United States Patent and Trademark Office, Office Action Summary and Detailed Action, U.S. Appl. No. 14/299,531, Oct. 10, 2014, 6 pages.
Applicant, Response (Response to Oct. 10, 2014, Office action), U.S. Appl. No. 14/299,531, Oct. 17, 2014, 3 pages.
United States Patent and Trademark Office, Office Action Summary and Detailed Action, U.S. Appl. No. 14/299,651, Oct. 16, 2014, 5 pages.
Applicant, Response (Response to Oct. 16, 2014, Office action), U.S. Appl. No. 14/299,651, Oct. 17, 2014, 3 pages.
United States Patent and Trademark Office, Office Action Summary and Detailed Action, U.S. Appl. No. 131/950,860, Sep. 3, 2014, 9 pages.
Applicant, Amendment (Response to Sep. 3, 2014, Office action), U.S. Appl. No. 13/950,860, Mar. 3, 2015, 11 pages.
United States Patent and Trademark Office, Office Action Summary and Detailed Action, U.S. Appl. No. 131/950,860, Apr. 2, 2015, 8 pages.

* cited by examiner

SYSTEM FOR TEXT ASSISTED TELEPHONY

CROSS-REFERENCE TO RELATED APPLICATIONS

This application is a continuation of application Ser. No. 11/955,476 filed Dec. 13, 2007 now U.S. Pat. No. 8,213,578, which is a continuation of application Ser. No. 11/257,703 filed Oct. 25, 2005, now U.S. Pat. No. 7,319,740, which is a continuation of application Ser. No. 10/634,965 filed Aug. 5, 2003, now U.S. Pat. No. 7,003,082, which is a continuation of application Ser. No. 09/938,194 filed on Aug. 23, 2001, now U.S. Pat. No. 6,603,835.

STATEMENT REGARDING FEDERALLY SPONSORED RESEARCH OR DEVELOPMENT

Not applicable.

BACKGROUND OF THE INVENTION

The present invention relates to the general field of telephone communications. In more particular, the invention relates to systems to assist telephone communications by those persons who are deaf, hard of hearing, or otherwise have impaired hearing capability.

Most modern human communications in both social and business environments takes place through sound communications. Yet within modern society there are many persons who have attenuated hearing capability. To assist those persons in making use of our telephonic communication system built for the hearing majority, there has been developed a system of telephone communication which has been principally used by the deaf community. That system makes use of a category of device known variously as a telecommunication device for the deaf (TDD), text telephone (TT) or teletype (TTY). Current TDDs are electronic devices consisting of a key board and a display as well as a specific type of modem, to acoustically or directly couple to the telephone line. Modern TDDs permit the user to type characters into their keyboard, with the character strings then encoded and transmitted over the telephone line to be displayed on the display of a communicating or remote TDD device.

Most TDD communication is conducted in an idiosyncratic code specific to the community of TDD users. This code, known as Baudot, evolved historically at a time when many telecommunication devices for the deaf were based on mechanical or electromechanical devices rather than the current technology based on digital electronic components. Accordingly, the Baudot protocol was constructed for a set of constraints which are no longer relevant to present date devices. The original Baudot protocol was a unidirectional or simplex system of communication conducted at 45.5 Baud. The conventional Baudot character set was a character set consisting of 5 bit characters and the system encodes the bits of those characters in a two-tonal system based on carrier tones of 1400 and 1800 Hertz.

The system of TDD communications is widely used and in fact has become indispensable to the deaf community throughout the industrialized world. Deaf persons extensively communicate with their neighbors and with other deaf and hearing people remotely, using the TDD system. In addition, systems have been developed to facilitate the exchange of communication between the deaf community and hearing users who do not have access to or utilize a TDD device. In the United States, telephone companies have set up a service referred to as a "relay." A relay, as the term is used herein, refers to a system of voice to TDD communication in which an operator, referred to as a "call assistant," serves as a human intermediary between a hearing user and a deaf person. Normally the call assistant wears a headset that communicates by voice with the hearing user and also has access to a TDD device which can communicate to the deaf user using a TDD appropriate protocol. In normal relay operations in the prior art, the call assistant types at a TDD keyboard the words which are voiced to her by the hearing user and then voices to the hearing user the words that the call assistant sees upon the display of his or her TDD. The call assistant serves, in essence, as an interpreting intermediary between the deaf person and the hearing person to translate from voice to digital electronic forms of communication.

A system to assist users of the telephone system who are hard of hearing but not deaf has been described. This system, sometimes referred to as text enhanced telephony, makes use of the existence of relays to supplement telephone communications for users who can hear, but have attenuated hearing capabilities. This systems includes, in its simplest embodiment, a visually readable display connected in series between the telephone used by the assisted user and the connection to the telephone network. The text enhanced telephone call is connected through a relay which transmits both the voice of the hearing user at the other end and a text stream of the words spoken by that user on the same telephone line. The details of the concept and of some embodiments of that system are disclosed in U.S. Pat. No. 6,075,842, the disclosure of which is hereby incorporated by reference.

BRIEF SUMMARY OF THE INVENTION

The present invention is summarized in that a relay system to facilitate the translation of information and communication between deaf and hearing persons includes a call assistant who re-voices the words of the hearing person which are spoken to the call assistant. The words spoken by the call assistant are recognized by a speech recognition computer program which has been trained to the voice pattern of the call assistant, such that the words are promptly translated into a high speed digital communication protocol. That high speed digital communication message is then transmitted electronically promptly by telephone to a visual display accessible to the deaf person.

It is an advantage of the invention described herein that the call assistant does not have to type most, if any, of the words spoken by the hearing person in the communication session so that the overall speed of communications from the hearing person to the deaf person is dramatically increased.

It is an object of the present invention that the design and utilization of a relay operated in accordance with the protocols described herein permits the introduction of small hand-held personal interpreter which will enable on the spot communications between deaf persons and hearing persons wherever the deaf persons might go.

Other objects, advantages and features of the present invention will become apparent from the following specification when taken in conjunction with the accompanying drawings.

DETAILED DESCRIPTION OF THE INVENTION

Figure 1:
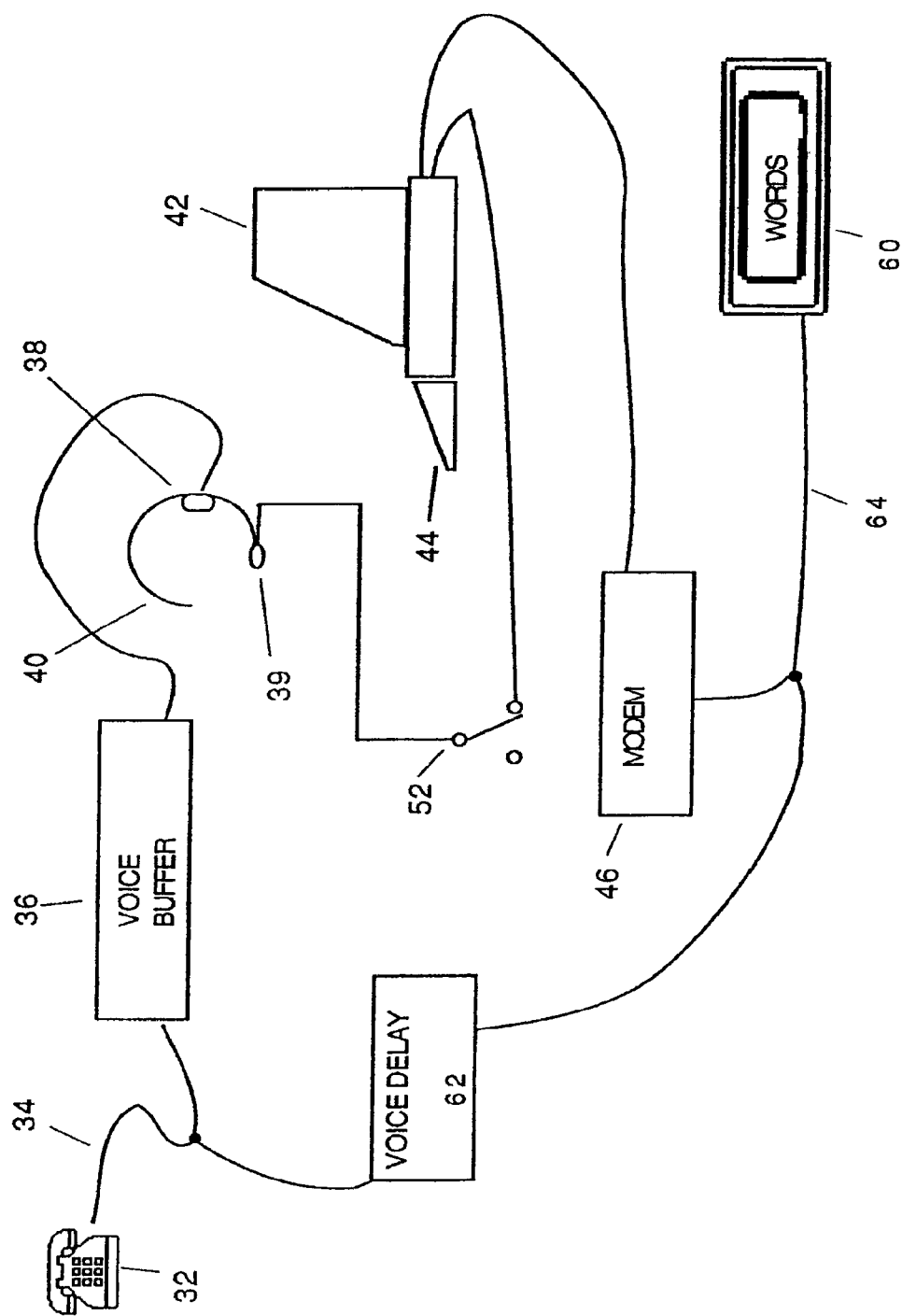
FIG. 1 is a schematic block diagram of a re-voicing relay.

The present invention is intended to provide an alternative arrangement for the delivery of text assisted telephone services, also called captioned telephone, to a telephone system user with diminished hearing. The present system is intended to take advantage of two developments in the field of assisted telephone services, the personal interpreter and the re-voicing relay. The arrangement for using these capabilities here is designed not to provide text services for the profoundly deaf, but to provide a text assistance service for those who can hear, but who may have diminished hearing. This service is designed to supplement rather than replace the transmission of the spoken voice word to the assisted user. To assist understanding what is contemplated here, the basic technologies of the personal interpreter and the re-voicing relay will be described here first, after which the description will return to the main topic, text assisted telephone services or, as they are also known, captioned telephone services.

The personal interpreter is intended to be a small portable device capable of delivering, with the support of a relay, text to a deaf user of any human conversation occurring in the presence of the personal interpreter. The personal interpreter is set up to connect telephonically to a relay, transmit spoken words to the relay, and then display for the assisted user the text of the words transmitted over the telephone connection to the relay. To make the personal interpreter work more seamlessly to produce more conversation-like communication, a faster relay methodology was needed. To fill this need, the re-voicing relay was designed.

The re-voicing relay is based upon the underlying technology of using voice recognition software, operated by a call assistant (a "CA"), to assist in the voice to text translation inherent in providing relay services. The re-voicing strategy is described in U.S. Pat. No. 5,909,482, the disclosure of which is hereby incorporated by reference. The re-voicing relay has its first implementation in providing voice to text transcription services for the deaf. However, the relay voice to text transcription service has use for users other than those who are deaf. It is envisioned that there are a number of hearing or partially hearing users who would have reason to benefit from voice to text transcription services. Relay voice to text service might also be useful for any application in which it is desired to supplement voice communications by a text transcription of the voice spoken on the telephone. Thus, while the operation of the relay will sometimes be described here by referring to an "assisted user," who may be deaf or hard of hearing, but who also may be a normally hearing person who simply wants text assistance for some reason. The user at the other end of the line will be referred to here as the hearing user, simply for the purpose of having something to call that person, even though both users may be hearing.

Personal Interpreter.

Figure 2:
FIG. 2 is an exterior view of a personal interpreter enabled by the relay of FIG. 1.

Shown in FIG. 2 is an illustration of what a personal interpreter 10 can look like. This would be a small hand held device typically the size of a small hardbound book. It would have a keyboard of minimal size, but useable by a deaf person who can type. It would have a two or four line display, but the display could be any size that conveniently fits in the case of the device. The device would also have a key or switch which would initiate its operation.

Shown in FIG. 2 is a schematic block diagram of the internal mechanics of the personal interpreter. The personal interpreter keyboard shown at 12 and its display as shown at 14. Inside the interpreter itself is a microprocessor shown at 16. Not shown, but included within the personal interpreter, would be the appropriate memory and interface devices so as to allow the microprocessor to be programmed and to operate the personal interpreter and perform its functions, in a manner well known in the art. Also inside of the personal interpreter is a modem 18. The modem 18 is preferably a modem specifically designed for interface with the deaf telecommunications system. Most telecommunications with the deaf community are conducted using a Baudot type code. One useful alternative is for the modem be designed to use the enhanced form of Baudot communication known as "Turbo Code" (Ultratec), which is generally described in U.S. Pat. No. 5,432,837, U.S. Pat. Nos. 5,517,548, and 5,327,479, the disclosure of which is hereby incorporated by reference. Another alternative is that the modem use a new variant of Turbo Code, one which uses higher carrier frequencies (in the range of 3000-3500 hertz) and a faster baud rate (over 100 baud). The most preferred alternative is for the modem to use a digital communication protocol which can both transmit and receive digital packets which contain either or both of voice and text. The output of the modem is preferably wired to a cellular telephone 20 included within the case of the personal interpreter 10. The cellular telephone 20 has a suitable antenna provided on it so that it may dial a cellular telephone network by radio frequency communications of the type normally conducted by cellular telephones. The personal interpreter also includes jack 28 to connect to a conventional wired or land-line telephone line as well. The personal interpreter also includes a microphone 22 and a speaker 24. A filter 26 connects the speaker 24 and the microphone 22 to the telephone 20.

A brief description of the operation and functionality of the personal interpreter reveals the dramatic improvement and convenience and portability that this device gives to text assisted people. A assisted user could go into an establishment, be it a government office or retail facility, in which there are only hearing persons. The assisted person would carry with him or her the personal interpreter 10. The assisted user would then place the personal interpreter 10 upon a counter or other surface, open it up, and press the initiation key or start button. The microprocessor 16 and modem 18 of the personal interpreter then power up and act in many ways like a normal TDD device operating in telecommunication standard, such as Turbo code. However, there is one critical difference. The start or initiation key further causes the microprocessor 16 of the personal interpreter to dial a relay to set up a relay communication session and includes in its communication with the relay a message, using the enhanced command features available in advanced telecommunication protocols, such as Turbo Code, to initiate a special format of relay call adapted for the personal interpreter. Other codes which permit command functions, such as ASCII or CCITT, could also be used. The first operation is to activate the cellular telephone and direct the cellular telephone to dial the number of a relay operating in accordance with the method of the present invention. The cellular telephone dials the relay. Obviously, no wired connection is required to allow the cellular telephone function to establish a telephone connection with the remote relay, but alternatively the jack 28 to a conventional telephone line could be used. In addition, when the relay answers the telephone connection, the microprocessor 16 of the personal interpreter 10 is instructed to provide command codes to the remote relay. These command codes, a feature possible through the use of Turbo Code, permits the personal interpreter to tell the relay that this is a personal interpreter-type relay communication session. All of this can happen in the time necessary to initiate the cellular call, perhaps two to ten seconds.

Then, the assisted person can use the personal interpreter to translate words spoken by hearing persons in the presence of the personal interpreter into visually readable text. This is done by the personal interpreter 10 through an unseen relay. Words spoken by the hearing persons in the presence of the personal interpreter 10 are picked up by the microphone 22. Those words are then transmitted through the cellular telephone 20 to the remote relay. The relay, operating as will be described below, then immediately transmits back, in enhanced Turbo Code, a digital communication stream translating the words that were just spoken. The words are received by the modem 18, and the microprocessor 16 in the personal interpreter 10, and it is displayed promptly upon the display screen 14. If the assisted person can speak, he or she may then answer the hearing person with a spoken voice, or, the assisted person may alternatively type upon the keyboard 12. If the assisted user types on the keyboard 12, the personal interpreter transmits the communication by digital communication to the relay. The call assistant at the relay then reads and speaks the words typed by the assisted user which are transmitted to the speaker 22 contained in the personal interpreter into a voice communication which can be understood by the hearing users. The filter 26 filters out the digital communication frequencies from the sound generated by the speaker 22. Thus, in essence, the assisted person has a personal interpreter available to him or her at all times of the day or night wherever the assisted person is within the range of the cellular telephone system. Also, because the relay is preferably operating in accordance with the fast translation methodology described below, a very conversation-like feel can occur in the communication session between the assisted user and the hearing persons in the presence of the personal interpreter 10. In order for this communication session to be satisfactory to the hearing users as well as the assisted person, however, the relay must operate exceedingly rapidly. It is, in part, to meet the need for the exceeding rapidity of this conversational style of communication that the re-voicing relay protocol has been designed.

Re-Voicing Relay.

Figure 3:
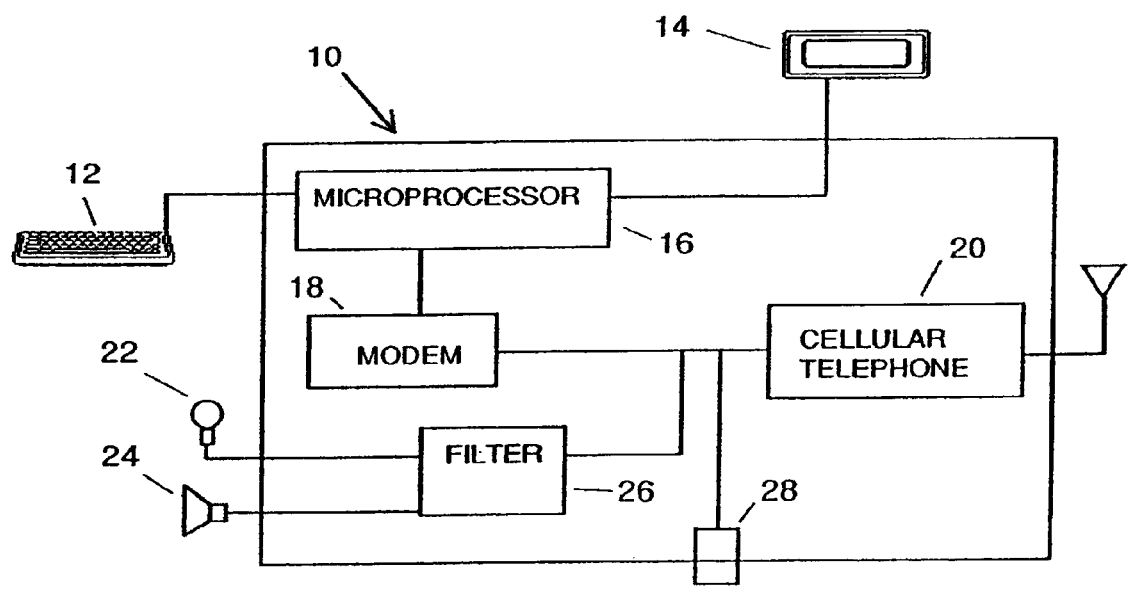
FIG. 3 is a schematic block diagram of the personal interpreter of FIG. 2.

Shown in FIG. 1 is a relay intended to provide the voice to text capability to support the personal interpreter, and which can also support other voice to text services to provide services for assisted users. FIG. 1 is intended to show, in schematic fashion, how such a relay system can be set up. Shown at 32 is a telephone of a hearing person. Instead of a telephone of a hearing person, the input could also be the microphone of the personal interpreter 10 shown in FIGS. 2 and 3. The telephone of the hearing person 32 is connected through a telephone line 34 to a voice input buffer 36 at the relay. The telephone line 34 can be an actual physical land line, or two pair between the telephones, or can be a cellular or other over-the-air telephone linkage. The voice input buffer 36 is a simple buffer to ensure temporary capture of the voice in the event that the call assistant gets behind and needs to buffer or delay the voice of the hearing person. In any event, the output of the input voice buffer 36 is provided to a headset 40 where earphones 38 produce the sound of the remote speaking person in the ear of the call assistant. The call assistant is wearing the headset 40 and sitting at a computer 42 capable of communicating in an enhanced Baudot communication, such as Turbo Code or whatever other code protocol is being used. However, typically the call assistant does not type the words which the call assistant hears in his or her earphone 38. Instead, the call assistant then speaks the words which he or she hears in the earphones 38 into a microphone 39 in the headset 40. The microphone 39 on the headset 40 is connected to transmit the voice of the call assistant to the computer 42 at which the call assistant sits.

Captioned Telephone.

As mentioned earlier, captioned telephone is a technology intended to provide text assistance to assisted user during the course of a voice telephone communication session. As will become apparent from the discussion below, a captioned telephone connection can be a single line connection or a multiple line connection. There are advantages and disadvantages of each approach. A single line connection is known in the art, as exemplified by U.S. Pat. No. 6,075,842, mentioned previously. The advantages and details of the use of a multiple line connection are described below. The discussion of captioned telephone will begin with a single line connection.

Figure 4:
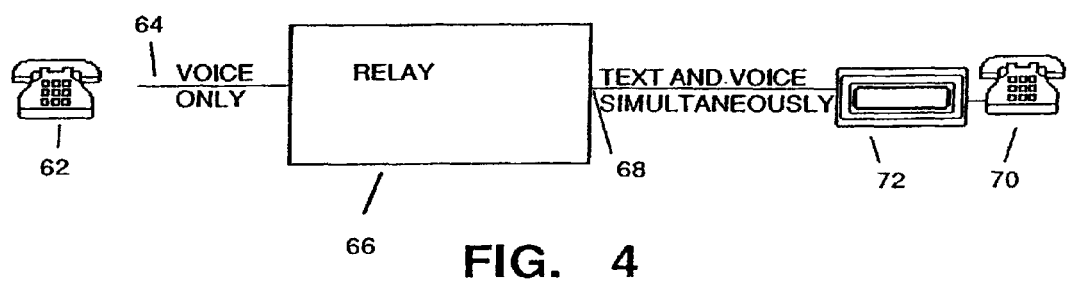
FIG. 4 illustrates the operation of a captioned telephone service supported by a relay.

Shown in FIG. 4 is an illustration of how a typical telephone call involving a single line captioned telephone would be set up. The hearing user at telephone 62 communicates through a telephone line 64 with the relay, indicated at 66. The relay, a re-voicing relay, communicates through a telephone line 68 with the assisted user. At the site of the assisted user is a telephone 70 used by the assisted user and also a captioned telephone device 72. The telephone 70 is conventional. The captioned telephone device 72 is constructed to accomplish two objectives. One objective is to filter, or separate, the digital signals carrying the text information from the voice signal. The other objective is to take the digital signals and create a visual display of the text information for the assisted user. This device is thus intended to assist the user to understand a greater portion of the conversation by providing a visually readable transcription of the text of the telephone conversation so that the assisted user can read any words that he or she cannot hear properly. While the captioned telephone device 72 of FIG. 4 is illustrated as a separate stand-alone device from the telephone 70, those of skill in the art can readily appreciate that the two functions can be combined in a special capability telephone station. Such a special purpose station can both provide conventional telephone service and also include a display which can be used to provide captioning for an assisted user.

Figure 5:
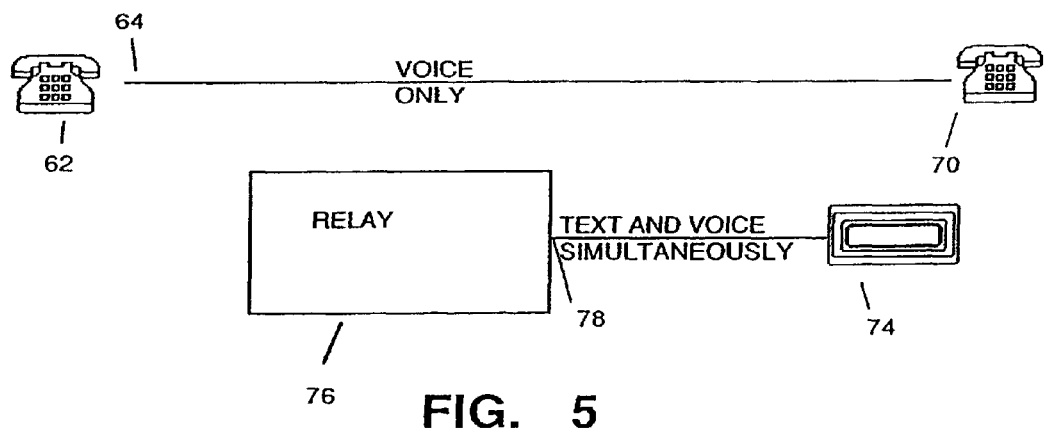
FIG. 5 is a schematic illustration of the concept of the two wire captioned telephone device connection with sound interconnection.

The two line captioned telephone is indicated in FIG. 5. In its simplest embodiment, the two-line captioned telephone can be conceptually thought of as a personal interpreter used to provide text assistance to a telephone user. Thus in FIG. 5, the telephone of the hearing user 62 and the telephone of the assisted user 70 are connected directly by a simple single telephone connection, indicated by the telephone line 64. The assisted user then uses a personal interpreter/captioned telephone ("PICT") device 74 to connect to a relay 76 over a second telephone line or connection, indicated at 78. There must be some form of communication between the telephone of the assisted user 70 and the PICT device 74, so that the voice of the hearing user can be transferred to the second telephone line 78 to the relay 76. At its simplest, the connection can be a simple acoustic connection, such as placing the sound pick-up microphone of the PICT device in such a location that the sound of the hearing person's voice is picked up and transmitted to the relay. A microphone connected to the PICT device 74 could be placed on the handset of the assisted user's telephone 70. However, it is preferred that the PICT device be electronically connected to the telephone of the assisted user so that the voice of the hearing user can be transmitted to the relay call assistant with minimal interference or noise. The PICT device includes a visually readable display and suitable decoding electronics and software so that the device can receive and display a text stream received from the relay over the second telephone line.

The main advantage of the two-line approach to captioned telephone is that the captioned telephone service can be added to a telephone call already in progress. By contrast, to use single line captioned telephone for an incoming call, the call must be directed through the relay to the assisted user at the beginning of the call. For a two-line captioned telephone call, however, the call can be started as a normal telephone communication session, without the relay or the captioning. Then, if the assisted user decides captioning would be helpful to his or her understanding of the conversation, the captioning service can be added while the call is in progress. To add the captioning service, the assisted user simply has the PICT device dial the relay over the second telephone line. The voice of the hearing user is then transmitted over the second telephone line to the relay. The relay converts the voice to text and the text stream created by the relay returns to the assisted user, also over the second telephone line. Note that in this arrangement, as indicated in FIG. 5, voice and text are transmitted in opposite directions over a single telephone line between the PICT device and the relay, voice going to the relay and text returning on the same line. This arrangement of voice and text is the same as used for the personal interpreter.

Figure 6:
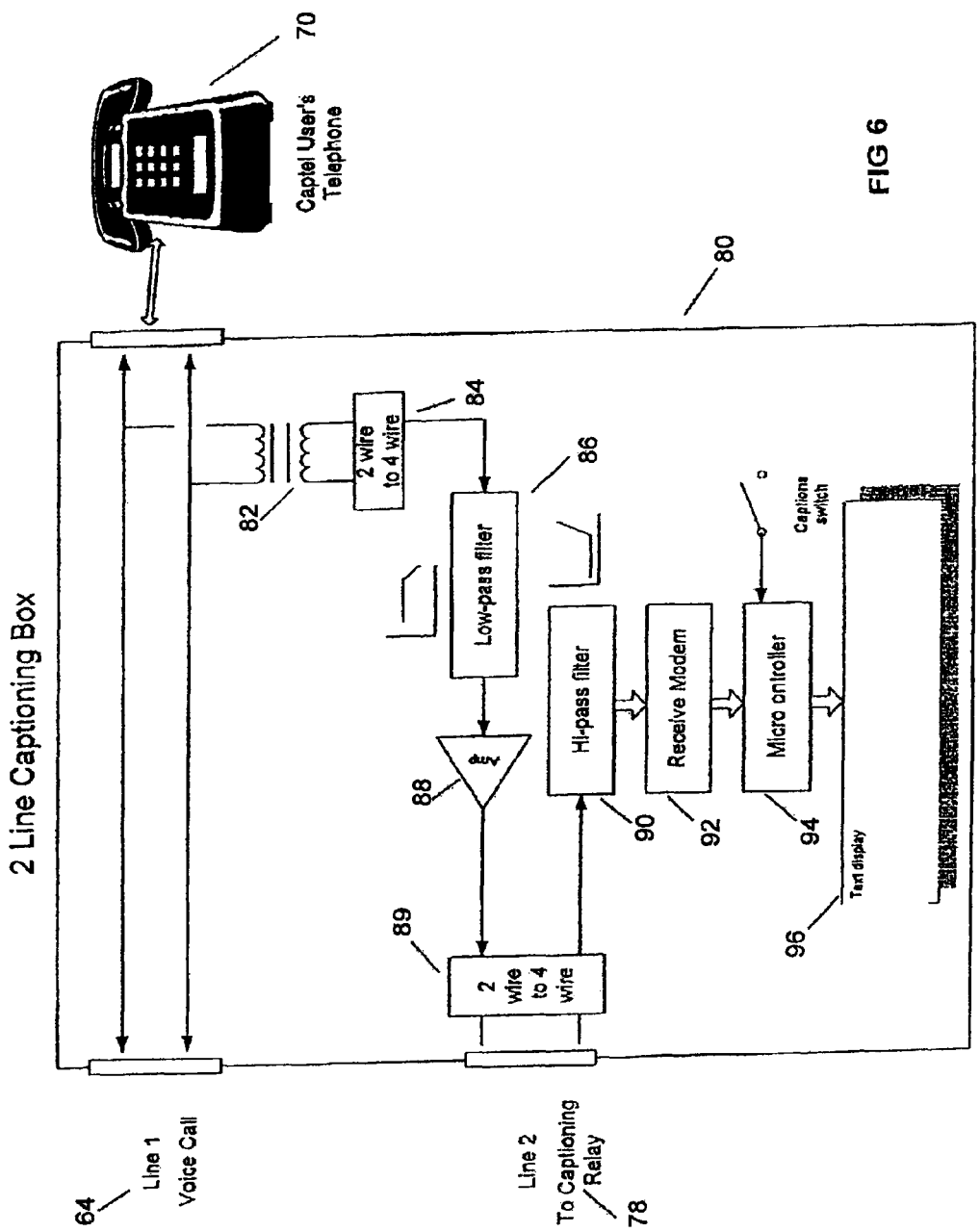
FIG. 6 is a schematic illustration of the connection of a personal interpreter/captioned telephone device connected to two telephone lines.

One device intended to implement the two-line captioned telephone approach is illustrated in FIG. 6. The PICT device 80 of FIG. 6 is an analog device connected in series between the telephone line 64 to the hearing user and the telephone 70 of the assisted user. As seen in FIG. 6, the telephone line 64 is connected directly through the PICT device 80 to the telephone 70. However, that telephone connection is also connected through a transformer 82 to a 2-wire to 4-wire converter 84. Connected to the output of the converter 84 is a low pass filter 86, the output of which is the input to an amplifier 88. The output of the amplifier 88 is connected to a 2-wire to 4-wire converter 89 which connects, in turn, to the telephone line 78 which connects to the relay (not shown here). The input signals from the telephone line 78 are connected to a hi-pass filter 90, the output of which passes through a receive modem 92 to a microcontroller 94. The microcontroller operates the display 96. The microcontroller also includes the capability to generate DTMF dialing tones and impress those tones on the telephone line 78 when it is time to dial the relay. Thus here the single PICT device 80 connects to two telephone lines. A call can be initiated or received by the assisted user in the same manner as with a conventional telephone, using only the first telephone line 64. When the user wishes to invoke the captioning service, the assisted user presses a button, 97, on the PICT device 80 that causes the device to automatically dial the relay on the second telephone line 78. The PICT device automatically transmits the voice signals on the first telephone line to the second telephone line (through the low-pass filter 86) for transmission to the relay. At the relay, the voice is converted into text and a text stream is sent back down the telephone connection 78 to the PICT device. The PICT device filters the text data, at the hi-pass filter 90, and transmits it to the microcontroller 94 for display to the user. None of the text data, and no digital carrier signals, are heard by either the hearing user or the assisted user. Normally the hearing user does not even need to be aware that captioning is being used on the call.

This example assumes that the digital carrier signals for the text message are carried on high frequencies, and the low pass and high pass filters are used to separate voice from text. While this filtering can be implemented as an analog filter, in many telephonic systems today, digital forms of communication are used. Using a digital communication protocol between the relay and the PICT device, communication is in the form of digital data packets of either text or digitized voice. In that event, the logical filtering simply consists of not creating any acoustic noise from the packets designated as carrying text.

Several physical versions of the PICT device are contemplated. In the version illustrated in FIG. 5, the PICT device is a stand-alone appliance inserted in series between the telephone of the assisted user and the telephone jack on the wall of the user's home. It may also be convenient for the user to package the PICT device as a single two-line unit intended to provide both conventional telephone service, as well as captioned telephone services. The device could look like a normal telephone, but have a display. The captioned telephone feature would be activated by a button or key, which would cause the unit to dial a pre-selected relay and set up a captioning session, whether or not a call on the other line is yet in progress. The voice signals incoming on the first telephone line from the hearing user would be transferred electronically to the telephone line to the relay. Text signals would be transmitted on that same telephone line back from the relay to the PICT device, which would display that text for the assisted user. Since the re-voicing relay operates with only a very slight time delay, the text display for the assisted user would trail the hearing person's voice slightly, but the text would still assist the user in comprehending the conversation.

It is a desirable feature of the two-line captioned telephone arrangement that the use of the captioning service is transparent to the hearing user. The hearing user would dial to connect to the assisted user as with any other telephone user. The assisted user invokes the captioned telephone service without the need to involve the hearing user at all. The service can be used equally well and transparently for both incoming and outgoing calls.

It is also envisioned that the captioned telephone service can be implemented in a way that uses three telephone lines. One line is for voice communications with the hearing user. The second line is directly connected to the first line so that the voice of the hearing user is transmitted to the relay. The third line is a connection to transmit the text stream from the relay to the station of the assisted user.

In the implementation of a relay providing captioned telephone service, the relay receives the voice of the hearing user and transmits both a digital text message stream and the voice of the hearing user over a telephone connection to the station of the assisted user. It is to be understood, however, that a conventional telephone single line connection is only one example of a telephonic connection that can be used in this arrangement. Digital wireless connection, or PCS connection, or even internet protocol (IP), wired or wireless connection can be used to connect the relay to the assisted user, so long as the connection in capable of transmitting voice to that user.

Thus the term telephone line as used in this specification is intended not only to apply to a traditional land-line two-wire telephone line, but also to all equivalents that offer similar functionality. Each of the telephone lines could be, for example, a portion of the bandwidth of an ISDN or DSL service. The telephone line could be an analog or digital cellular telephone link or a PCS connection. The PICT device could also be connected to the internet communication in IP, and in that event the two telephone lines would simply be simultaneous digital data exchange with two remote locations.

It is to be understood that the present invention is not limited to the particular illustrations and embodiments disclosed above, but embraces all such modified forms thereof as come within the scope of the following claims.

We claim:

1. A method for providing captioned services to an assisted user communicating with a hearing person, the method comprising the steps of:
   providing a relay for providing captioned text of a telephonic communication, the relay including a computer, a relay input device and a relay display screen;
   providing an assisted user's captioned device that is linkable to at least first and second communication links, the captioned device including a display, a speaker, a microphone, a caption switch and a captioned device processor, the caption switch controllable by the assisted user to invoke a captioning service, the processor in communication with the caption switch and the display, the captioned device configured to perform the steps of:
   (i) initiating a voice call on the first communication link between the hearing person and the assisted user's captioned device during which voice communication occurs between the assisted user speaking into the microphone and the hearing person;
   (ii) while the voice call is progressing on the first communication link, receiving an indication that the caption switch has been selected via the assisted user's captioning device invoking the captioning service;
   (iii) initiating the second communication link from the captioned device processor to the relay for producing captioned text;
   (iv) after the second communication link is established, receiving words spoken in voice by a hearing person on the first communication link;
   (v) providing the words spoken by the hearing person over the second communication link to the relay so that the relay can convert the words spoken by the hearing person into text;
   (vi) receiving text corresponding to the converted words transmitted from the relay;
   (vii) displaying the received text on the display; and
   (viii) broadcasting the voice of the hearing person via the speaker; and
   the relay configured to perform the steps of:
   (i) transcribing the words spoken by the hearing person into a text message stream;
   (ii) displaying the text message stream on the relay display screen;
   (iii) receiving corrections to the text message stream entered by a call assistant using the relay input device to generate corrected text; and
   (iv) transmitting the corrected text to the captioned device for display to the assisted user.

2. The method of claim 1 wherein the second communication link is an internet communication link.

3. The method of claim 2 wherein the first communication link is a telephone line.

4. The method of claim 1 wherein the step of receiving text includes receiving the text corresponding to the converted words on the second communication link.

5. The method of claim 4 wherein the second communication link is an internet communication link.

6. The method of claim 1 wherein the step of receiving text includes receiving the text over a third communication link separate from the first and second communication links.

7. The method of claim 6 wherein each of the second and third communication links is an internet communication link.

8. The method of claim 7 wherein the first communication link is a telephone line.

9. The method of claim 1 wherein the step of initiating the second communication link occurs after the step of establishing a voice call on the first communication link.

10. The method of claim 1 wherein the step of initiating the second communication link occurs while the voice call on the first communication link is progressing.

11. The method of claim 1 wherein the step of establishing a voice call on the first communication link includes receiving an indication from the assisted user's captioned device invoking the first communication link.

12. The method of claim 1 wherein the microphone and the speaker are in communication with the captioned device processor.

13. The method of claim 12 wherein the captioned device processor is programmed to perform the steps of the captioned device.

14. The method of claim 1 wherein the caption switch includes a button.

15. The method of claim 1 wherein the relay further includes a speaker and a microphone, the step of transcribing the words spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

16. The method of claim 1 wherein the step of providing an assisted user's captioned device includes providing a single device that is linkable to at least first and second communication links, the single device including the display, the speaker, the microphone, the caption switch and the captioned device processor that comprise the assisted user's captioned device.

17. The method of claim 1 wherein only the hearing person's voice and the assisted user's voice are transmitted on the first communication link.

18. A method of operating an assisted user's captioning device for providing captioned services to an assisted user communicating with a hearing person, the method comprising the steps of:
   providing a relay for producing captioned text of a telephonic communication, the relay including a relay computer, a relay input device and a relay display screen;
   providing an assisted user's captioned device that is linkable to at least first and second communication links, the captioned device including a display, a speaker, a microphone, an activation switch and a captioned device processor, the display and activation switch in communication with the captioned device processor, the activation switch selectable by the assisted user to commence a captioning service, the captioned device configured to perform the steps of:
   (i) receiving words spoken by the hearing person on the first communication link;
   (ii) broadcasting the words spoken by the hearing person to the assisted user via the speaker substantially in real time as the words spoken by the hearing person are received by the captioned device;

(iii) after at least some words spoken by the hearing person are broadcast to an ear of the assisted user, receiving an indication via the assisted user's captioned device that the activation switch has been selected, initiating a connection to the relay over the second communication link in response to receiving the indication and providing the voice of the hearing person over the second communication link to the relay so that the relay can convert the words spoken by the hearing person into a text message stream;

(iv) receiving the text message stream from the relay over the second communication link; and (v) displaying the received text message stream on the display;

the relay configured to perform the steps of:

(i) transcribing the words received via the second communication link and spoken by the hearing person into a text message stream;

(ii) displaying the text message stream on the relay display screen;

(iii) receiving corrections to the text message stream entered by a call assistant using the relay input device to generate corrected text; and (iv) transmitting the corrected text to the captioned device.

19. The method of claim 18 wherein the second communication link is an internet communication link.

20. The method of claim 18 wherein the first communication link is a telephone line.

21. The method of claim 18 wherein the step of receiving the text message stream includes receiving a digital communication stream.

22. The method of claim 18 wherein the relay further includes a speaker and a microphone, the step of transcribing the words received via the second communication link and spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

23. The method of claim 18 wherein the first communication link is completely independent of the second communication link so that the hearing person's voice is transmitted to the relay from the assisted user's device completely independent of the first communication link and so that the text message is transmitted from the relay to the assisted user's device completely independent of the first communication link.

24. A system for providing captioned telephone service to an assisted user communicating with a hearing person, the system comprising:

a relay for providing captioned text, the relay including a relay computer, a relay input device and a relay display screen;

a captioned device that is linkable to at least first and second communication links, the captioned device comprising:

a captioned device processor;

a microphone;

a speaker;

a visually readable display in communication with the captioned device processor;

an activation switch in communication with the captioned device processor and selectable by an assisted user to initiate a captioning service;

the captioned device enabling the assisted user to use the captioned device to facilitate a telephonic communication via the first communication link between the user of the captioned device and a hearing person and facilitating a captioned call in which a text translation of words spoken by the hearing person is presented via the visually readable display, the captioned device configured to perform the steps of:

(i) facilitating a voice telephone call on the first communication link between the captioned device and the hearing person during which voice communication occurs between the hearing person and the assisted user and during which words spoken by the hearing person are received by the processor via the first communication link;

(ii) after the first communication link is established and while the voice telephone call is progressing, receiving an indication that the activation switch has been activated;

(iii) after receiving the indication that the activation switch has been activated, passing the words spoken by the hearing person to the relay via the second communication link;

(iv) receiving a text message corresponding to the words spoken by the hearing person from the relay; and (v) displaying the text message on the display within sight of the assisted user;

wherein the words spoken by the hearing person and received by the processor during each of the telephone call and the captioned call are broadcast via the speaker substantially in real time as the words are received by the processor;

the relay configured to perform the steps of:

(i) generating a text message stream corresponding to the words spoken by the hearing person and received via the second communication link;

(ii) displaying the text message stream on the relay display screen;

(iii) receiving corrections to the text message stream entered by a call assistant using the relay input device to generate corrected text; and (iv) transmitting the corrected text to the captioned device.

25. The system of claim 24 wherein the second communication link is an internet link.

26. The system of claim 24 wherein the step of facilitating a voice telephone call on the first communication link includes receiving an indication from the assisted user's captioned device invoking the first communication link.

27. The system of claim 24 wherein the microphone and the speaker are in communication with the captioned device processor.

28. The system of claim 27 wherein the captioned device processor is programmed to perform the steps of the captioned device.

29. The method of claim 27 wherein the caption switch includes a button.

30. The system of claim 24 wherein the relay further includes a speaker and a microphone, the step of generating a text message stream corresponding to the words spoken by the hearing person and received via the second communication link including presenting the spoken words by the hearing person to an ear of the call assistant via the speaker, receiving the spoken words revoiced by the call assistant via the microphone and using a processor trained to the voice of the call assistant to translate the revoiced words into the text message stream.

31. A system for providing captioned services to an assisted user communicating with a hearing person, the system comprising:
- a relay including a relay computer, a relay input device and a relay display screen;
- a captioned device that is linkable to at least first and second communication links, the captioned device comprising:
- a captioned device processor;
- a visual display in communication with the captioned device processor;
- a microphone;
- a speaker;
- an activator in communication with the caption device processor, the activator selectable by an assisted user to indicate that a captioned service should be invoked;
- the captioned device enabling a user to use the device to facilitate communications via the first communication link between the user and the hearing person and configured to perform the steps of:
  - (i) receiving words spoken by the hearing person on the first communication link during a voice conversation between the assisted user and the hearing person and broadcasting the hearing person's words via the speaker upon reception;
  - (ii) while receiving words spoken by a hearing person on the first communication link, receiving an indication via the activator on the captioned device that a captioning service should be invoked;
  - (iii) upon receiving the indication that a captioning service should be invoked, providing the words spoken by the hearing person over the second communication link to the relay so that the relay can convert the words spoken by the hearing person into text;
  - (iv) receiving text corresponding to the converted words transmitted from the relay; and
  - (v) displaying the received text on a display within sight of the assisted user;
- the relay configured to perform the steps of:
  - (i) generating a text message stream corresponding to the words spoken by the hearing person;
  - (ii) displaying the text message stream on the relay display screen;
  - (iii) receiving corrections to the text message stream entered by a call assistant using the relay input device to generate corrected text; and
  - (iv) transmitting the corrected text to the captioned device.

32. The system of claim 31 wherein the second communication link is an internet communication link.

33. The system of claim 32 wherein the first communication link is a telephone line.

34. The system of claim 31 wherein the captioned device is further programmed to perform the step of, upon receiving the indication that a captioning service should be invoked, initiating a connection over the second communication link.

35. The system of claim 34 wherein the activator includes a switch.

36. The system of claim 31 wherein the step of receiving text includes receiving the text corresponding to the converted words on the second communication link.

37. The system of claim 36 wherein the second communication link is an internet communication link.

38. The system of claim 31 further including circuitry for connecting to a third communication link wherein the step of receiving text includes receiving the text over the third communication link separate from the first and second communication links.

39. The system of claim 38 wherein each of the second and third communication links are internet communication links.

40. The system of claim 39 wherein the first communication link is a telephone line.

41. The system of claim 31 further including the steps of receiving an indication via the assisted user's captioned device that the first communication link should be established and in response to the indication that the first communication link should be established, establishing the first communication link.

42. The system of claim 31 wherein the relay further includes a speaker and a microphone, the step of generating a text message stream corresponding to the words spoken by the hearing person including presenting the spoken words by the hearing person to an ear of the call assistant via the speaker, receiving the spoken words revoiced by the call assistant via the microphone and using a processor trained to the voice of the call assistant to translate the revoiced words into the text message stream.

43. A system for providing captioned services to an assisted user communicating with a hearing person, the system comprising
- a relay including a relay computer, a relay input device and a relay display screen;
- a captioned device that is linkable to at least first and second communication links, the captioned device comprising:
- a speaker;
- a microphone;
- a display within sight of the assisted user;
- an activation switch that can be selected by the assisted user to invoke a captioning service; and
- a device processor, each of the display and activation switch linked to the device processor, the device processor also linkable to first and second communication links, the captioned device enabling the assisted user to use the device to facilitate communications via the first communication link between the assisted user and the hearing person and configured to perform the steps of:
  - (i) receiving words spoken by a hearing person on the first communication link and broadcasting the hearing person's words via the speaker upon reception;
  - (ii) receiving words spoken by the assisted user via the microphone and transmitting the words received by the microphone via the first communication link to the device used by the hearing person;
  - (iii) receiving an indication that the activation switch on the assisted user's captioned device has been activated;
  - (iv) upon receiving the indication, providing the voice of the hearing person over the second communication link to the relay so that the relay can convert the words spoken by the hearing person into a text message stream;
  - (v) receiving the text message stream from the relay over the second communication link; and
  - (vi) displaying the received text on the display;
- the relay configured to perform the steps of:
  - (i) transcribing the words spoken by the hearing person into a text message stream;
  - (ii) displaying the text message stream on the relay display screen used by a call assistant;
  - (iii) receiving corrections to the text message stream entered by a call assistant using the relay input device to generate corrected text; and
  - (iv) transmitting the corrected text to the captioned device.

44. The system of claim 43 wherein the second communication link is an internet communication link.

45. The system of claim 43 wherein the first communication link is a telephone line.

46. The system of claim 43 wherein the step of receiving an indication occurs subsequent to broadcasting at least some of the words spoken by the hearing person via the speaker to the ear of the assisted user.

47. The system of claim 43 wherein the step of receiving the text message stream includes receiving a digital communication stream.

48. The system of claim 43 wherein the relay further includes a speaker and a microphone, the step of transcribing the words spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

49. A communication system for enabling communication between an assisted user and a hearing person, the system comprising:
   a relay including a relay processor, a relay input device and a relay display screen;
   an assisted user's captioned device that is linkable to at least first and second communication links, the captioned device including a speaker, a microphone, a display, a captioned device processor and an activator, the activator selectable by the assisted user of the captioned device to invoke a captioning service, the display and activator linked to the captioned device processor, the captioned device enabling the assisted user to use the device to facilitate communications via the first communication link between the assisted user and the hearing person and configured to perform the steps of:
   (i) receiving words spoken by the hearing person on the first communication link during a telephone call between the assisted user and the hearing person and broadcasting the words spoken by the hearing person via the speaker upon reception;
   (ii) receiving words spoken by the assisted user via the microphone and transmitting the words spoken by the assisted user to the hearing person;
   (iii) subsequent to broadcasting at least some words spoken by a hearing person received on the first communication link, receiving an indication via the activator on the captioned device invoking the captioning service;
   (iv) upon receiving the indication invoking the captioning service, initiating a connection over the second communication link from the captioned device to the relay;
   (v) providing words spoken by the hearing person to the relay over the second communication link;
   (vi) receiving a text message stream from the relay over the second communication link; and
   (vii) displaying the received text message on the display; and
   the relay processor programmed to perform the steps of:
   (i) receiving the words spoken by the hearing person from the assisted user's captioned device on the second communication link;
   (ii) transcribing the words spoken by the hearing person into the text message stream;
   (iii) displaying the text message stream on the relay display screen used by a call assistant;
   (iv) receiving corrections to the text message stream entered by a call assistant using the relay input device; and
   (v) transmitting the text message stream to the captioned device processor via the second communication link;
   whereby relay caption services can be provided to the assisted user without disturbing the telephone call on the first communication link between the assisted user and the hearing person.

50. The system of claim 49 wherein the second communication link is an internet link.

51. The system of claim 49 wherein the relay further includes a speaker and a microphone, the step of translating the words spoken by the hearing person into a text message stream including presenting the spoken words by the hearing person to an ear of a call assistant via the speaker, receiving the spoken words revoiced by the call assistant via the microphone and using a processor trained to the voice of the call assistant to translate the revoiced words into the text message stream.

52. The system of claim 49 wherein the step of transmitting the text message stream includes converting the text message stream into a digital communication stream and transmitting the digital communication stream to the captioned device processor.

53. A method of facilitating communication between an assisted user and a hearing user, the method comprising the steps of:
   providing a relay including a relay computer, a relay input device and a relay display screen;
   providing an assisted user's captioned device that is linkable to at least first and second communication links, the captioned device includes a speaker, a microphone, a display and a captioned device processor and that provides a caption switch selectable to initiate a captioning service, each of the display and the switch in communication with the captioned device processor, the captioned device configured to perform the steps of:
   facilitating a phone call on the first communication link and establishing voice communication between the hearing user and the assisted user where the hearing user's voice is broadcast via the speaker and the assisted user's voice is captured via the microphone and transmitted to the hearing user via the first communication link where the voice communication initially occurs without captioning;
   while the voice communication is progressing, identifying selection of the caption switch invoking the captioning service;
   upon identifying selection of the caption switch, establishing the second communication link from the assisted user's captioned device to the relay and providing the hearing user's voice to the relay via the second communication link while still broadcasting the hearing user's voice via the speaker to the assisted user;
   receiving text transcribed by the relay and associated with the hearing user's voice on the second communication link; and
   displaying the received text on the display screen;
   the relay configured to perform the steps of:
   (i) transcribing the words spoken by the hearing user into a text message stream;
   (ii) displaying the text message stream on the relay display screen;
   (iii) receiving corrections to the text message stream entered by a call assistant using the relay input device to generate corrected text; and
   (iv) transmitting the corrected text to the captioned device.

54. The method of claim 53 wherein the relay further includes a speaker and a microphone, the step of transcribing the words spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

55. A method of facilitating communication between an assisted user and a hearing user, the method comprising the steps of:
providing a relay including a relay computer, a relay input device and a relay display screen;
providing an assisted user's captioning device that is linkable to at least first and second communication links, the captioned device including a speaker, a microphone, a display and a captioned device processor wherein the display is in communication with the processor, the captioned device further including a caption switch selectable to initiate a captioning service, the captioned device configured to perform the steps of:
broadcasting via the speaker a hearing user's voice that is received by the captioned device; and
while a phone call is progressing, receiving an indication that the caption switch is selected and commencing a captioning service in response to the selection whereby the relay remote from the assisted user's captioned device and the hearing user transcribes the hearing user's voice to generate text;
wherein the hearing user's voice is received on a first communication link at the assisted user's captioned device and wherein the step of commencing a captioning service includes initiating a connection over the second communication link to the remote relay to transmit the hearing user's voice to the relay for transcription;
the remote relay configured to perform the steps of:
(i) transcribing the words spoken by the hearing user into a text message stream;
(ii) displaying the text message stream on the relay display screen;
(iii) receiving corrections to the text message stream entered by a call assistant using the relay input device to generate corrected text; and
(iv) transmitting the corrected text to the captioned device.

56. The method of claim 55 wherein the captioned device is further programmed to perform the steps of receiving the corrected text at the captioned device and presenting the corrected text via the display on the assisted user's captioned device.

57. The method of claim 55 wherein the relay further includes a speaker and a microphone, the step of transcribing the words spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

58. A system for providing captioned services to an assisted user communicating with a hearing person, the system comprising:
a relay including a relay computer, a relay input device and a relay display screen;
a captioned device comprising:
a visual display;
a speaker;
a microphone;
an activation switch controllable by the assisted user to, when activated, invoke a captioning service; and
a processor, the display and activation switch in communication with the processor, the captioned device configured to perform the steps of:
(i) receiving words spoken in voice by the assisted user via the microphone and transmitting the assisted user's voice to the hearing person via the first communication link during a voice conversation between the assisted user and the hearing person;
(ii) receiving words spoken by the hearing person on the first communication link during the voice conversation between the assisted user and the hearing person;
(iii) broadcasting the words spoken by the hearing person to the assisted user via the speaker;
(iv) subsequent to broadcasting at least some words spoken by the hearing person via the speaker, receiving an indication that the activation switch has been activated;
(v) upon receiving the indication that the activation switch has been activated, providing the words spoken by the hearing person over the second communication link to the relay so that the relay can convert the words spoken by the hearing person into text;
(vi) receiving text corresponding to the converted words transmitted from the relay; and
(vii) displaying the received text on the visual display within sight of the assisted user; and
the relay configured to perform the steps of:
(i) transcribing the words spoken by the hearing person into a text message stream;
(ii) displaying the text message stream on the relay display screen used by a call assistant;
(iii) receiving corrections to the text message stream entered by a call assistant using the relay input device to generate corrected text; and
(iv) transmitting the corrected text to the captioned device.

59. The system of claim 58 wherein only assisted user and hearing person voice signals are transmitted on the first communication link during the voice conversation.

60. The system of claim 58 wherein the relay further includes a speaker and a microphone, the step of transcribing the words spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

61. A system for providing captioned services to an assisted user communicating with a hearing person, the system comprising:
a relay for providing a captioning service, the relay including a relay computer, a relay input device and a relay display screen;
an assisted user's captioned device comprising:
(i) a captioned device processor;
(ii) a visual display in communication with the captioned device processor;
(iii) a microphone for receiving voice signals from the assisted user using the captioned device;
(iv) a speaker for broadcasting voice messages received by the captioned device to the assisted user substantially in real time as voice messages from the hearing person are received at the captioned device;

(v) a caption switch in communication with the captioned device processor, the caption switch controllable by the assisted user to indicate that a captioning service should be invoked;

the captioned device configured to perform the steps of:
(i) establishing the first communication link between the assisted user's captioned device and the hearing person;
(ii) obtaining voice signals from the assisted user via the microphone;
(iii) transmitting the assisted user's voice signals from the captioned device to the hearing person via the first communication link;
(iv) receiving voice signals from the hearing person on the first communication link;
(v) broadcasting the voice signals from the hearing person via the speaker to the assisted user;
(vi) detecting activation of the caption switch to invoke the captioning service;
(vii) in response to activation of the caption switch:
(a) transmitting the voice signals received at the captioned device from the hearing person to the relay via the second communication link;
(b) receiving text from the relay via the second communication link; and
(c) displaying the text received from the relay via the visual display;

the relay configured to perform the steps of:
(i) transcribing the words spoken by the hearing person into a text message stream;
(ii) displaying the text message stream on the relay display screen used by a call assistant;
(iii) receiving corrections to the text message stream entered by a call assistant using the relay input device to generate corrected text; and
(iv) transmitting the corrected text to the captioned device processor to be presented via the visual display to the assisted user;

wherein the caption switch is activatable subsequent to broadcasting at least some voice signals from the hearing person to set up the captioning service while a voice call between the assisted user and the hearing person is on going.

62. The system of claim 61 wherein the captioned device further performs the step of, in response to activation of the caption switch, establishing the second communication link between the assisted user's device and the relay.

63. The system of claim 61 wherein the relay is remote from each of the assisted user's captioned device and the hearing person.

64. The system of claim 61 wherein the step of establishing the first communication link includes receiving an indication from the assisted user's captioned device invoking the first communication link.

65. The system of claim 61 wherein the relay is a preselected relay for the assisted user's device.

66. The system of claim 65 wherein the voice signals of the hearing person are transmitted as digital data packets to the relay on the second communication link and the text message is transmitted from the relay to the assisted user's device via data packets on the second communication link.

67. The system of claim 66 wherein the assisted user's voice signals transmitted to the hearing person's device are analog voice signals and the hearing user's voice signals received by the captioned device are analog voice signals.

68. The system of claim 67 wherein the step of establishing the first communication link includes receiving an indication from the assisted user's captioned device invoking the first communication link.

69. The system of claim 66 wherein the relay is remote from each of the assisted user's captioned device and the hearing person.

70. The system of claim 61 wherein the step of displaying the text message received from the relay includes displaying the corrected text within the text stream.

71. The system of claim 61 wherein the relay further includes a speaker and a microphone, the step of transcribing the words spoken by the hearing person into a text message stream including presenting the spoken words by the hearing person to an ear of the call assistant via the speaker, receiving the spoken words revoiced by the call assistant via the microphone and using a processor trained to the voice of the call assistant to translate the revoiced words into the text message stream.

72. The system of claim 61 wherein the first communication link is completely independent of the second communication link so that the hearing person's voice is transmitted to the relay from the assisted user's device completely independent of the first communication link and so that the text message is transmitted from the relay to the assisted user's device completely independent of the first communication link.

73. The system of claim 61 wherein the assisted user's caption device includes a single device.

74. The method of claim 61 wherein only the hearing person's voice and the assisted user's voice are transmitted on the first communication link.

* * * * *